US012374825B2

(12) United States Patent
Shah et al.

(10) Patent No.: US 12,374,825 B2
(45) Date of Patent: Jul. 29, 2025

(54) CONNECTOR FASTENER EXTENSION SYSTEM

(71) Applicant: Dell Products L.P., Round Rock, TX (US)

(72) Inventors: Maunish Shah, Austin, TX (US); Bruce Anthony Holmes, Austin, TX (US); Douglas Roy Kaiser, Pflugerville, TX (US); Jonathan P. Sprague, West Boylston, MA (US)

(73) Assignee: Dell Products L.P., Round Rock, TX (US)

( * ) Notice: Subject to any disclaimer, the term of this patent is extended or adjusted under 35 U.S.C. 154(b) by 389 days.

(21) Appl. No.: 18/104,038

(22) Filed: Jan. 31, 2023

(65) Prior Publication Data

US 2024/0258741 A1 Aug. 1, 2024

(51) Int. Cl.

| | |
|---|---|
| ***H01R 13/622*** | (2006.01) |
| ***H01R 13/516*** | (2006.01) |
| ***H01R 43/20*** | (2006.01) |
| ***H01R 103/00*** | (2006.01) |

(52) U.S. Cl.

CPC ......... *H01R 13/622* (2013.01); *H01R 13/516* (2013.01); *H01R 43/20* (2013.01); *H01R 2103/00* (2013.01)

(58) Field of Classification Search

CPC .. H01R 13/629; H01R 13/622; H01R 13/516; H01R 43/20; H01R 2103/00

USPC ......................................... 439/923, 320, 362

See application file for complete search history.

(56) References Cited

U.S. PATENT DOCUMENTS

| | | | | |
|---|---|---|---|---|
| 7,997,930 B2 * | 8/2011 | Ehret | H01R 13/622 439/578 |
| 8,939,783 B2 * | 1/2015 | Pfeiffer | H01R 13/6273 439/923 |
| 9,929,498 B2 * | 3/2018 | Thakare | H01R 13/622 |
| 9,929,499 B2 * | 3/2018 | Thakare | H01R 13/622 |
| 9,991,630 B1 * | 6/2018 | Thakare | H01R 13/622 |
| 10,270,206 B2 * | 4/2019 | Thakare | H01R 13/622 |
| 2004/0018764 A1 * | 1/2004 | Thurston | H01R 13/623 439/312 |
| 2005/0014410 A1 * | 1/2005 | Justice | H01R 13/623 439/320 |

* cited by examiner

*Primary Examiner* — Gary F Paumen
(74) *Attorney, Agent, or Firm* — Joseph Mencher

(57) ABSTRACT

A connector fastener extension system includes a connector fastener extension system having a fastener base and a fastener extension member. The fastener base defines a cable connector housing and a cable connector aperture adjacent the cable connector housing, with the fastener base configured to connect to a cable connector located on an end of a cable by positioning the cable connector in the cable connector housing such that at least a portion of the cable connector extends through the cable connector aperture. The fastener extension member is moveably coupled to the fastener base and configured to move away from the fastener base and towards the cable when the cable connector is connected to the fastener base, with rotation of the fastener extension member configured to cause rotation of the fastener base and the cable connector relative to the cable when the cable connector is connected to the fastener base.

20 Claims, 29 Drawing Sheets

CONNECTOR FASTENER EXTENSION SYSTEM

BACKGROUND

The present disclosure relates generally to information handling systems, and more particularly to facilitating the fastening and/or unfastening of a connector with an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as networking devices, server devices and/or other computing devices known in the art may utilize cabling systems to transmit data between computing devices in a networked system, provide connectivity to the Internet, and/or provide other communication needs between computing devices. Conventional cabling systems include a cable connector that connects a cable to a computing device connector on the computing device. For example, some cabling systems (e.g., SubMiniature version A connectors (SMA), semi-precision coaxial RF connectors, etc.) include a cable connector with a connector fastener that includes "hex" nut grip on the base of the cable connector, while other cabling systems provide a connector fastener that include a grip without a "hex" nut (e.g., N-connectors/type-N connectors, medium-size RF connectors used to join coaxial cables, etc.) on the base of the cable connector, and either connector fastener may be rotated by hand in order to fasten and unfasten the cable connector with the computing device connector on the computing device. However, such conventional cabling systems raise some issues.

In some situations, the dense configuration of computing device connectors on the hardware/cards in computing devices that receive these cable connectors can present issues with regard to the fastening and unfastening of those cable connectors with the computing device connectors on the computing device, as cabling systems connected to the computing device, computing device chassis features, and/or other obstructions on the computing device may restrict the hand/finger access required to access connector fasteners in order to fasten or unfasten cable connectors with computing device connectors. For example, insufficient space between computing device connectors, as well as clearance between the chassis housing and computing device connectors, can make it challenging to access and rotate the connector fasteners by hand. Conventional solutions to these issues include the use of "snap-in" cable connectors (e.g., SubMiniature version B (SMB) connectors) that require only that the connector fastener on the cable connector be pushed into a computing device connector, or pulled out of a computing device connector, in order to fasten and unfasten the cable connector with the computing device connector. However, such cable connectors can be inadvertently disconnected from their computing device connector in response to, for example, tension on their cable.

Accordingly, it would be desirable to provide a connector fastener system that addresses the issues discussed above.

SUMMARY

According to one embodiment, a cabling system includes a cable; a cable connector that is included on an end of the cable and that is configured to rotate relative to the cable; and an attachable connector fastener extension system that includes: a fastener base that defines a cable connector housing and a cable connector aperture adjacent the cable connector housing, wherein the fastener base is configured to connect to the cable connector by positioning the cable connector in the cable connector housing such that at least a portion of the cable connector extends though the cable connector aperture; and a fastener extension member that is moveably coupled to the fastener base and configured to move away from the fastener base and towards the cable when the cable connector is connected to the fastener base, wherein rotation of the fastener extension member is configured to cause rotation of the fastener base and the cable connector relative to the cable when the cable connector is connected to the fastener base.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
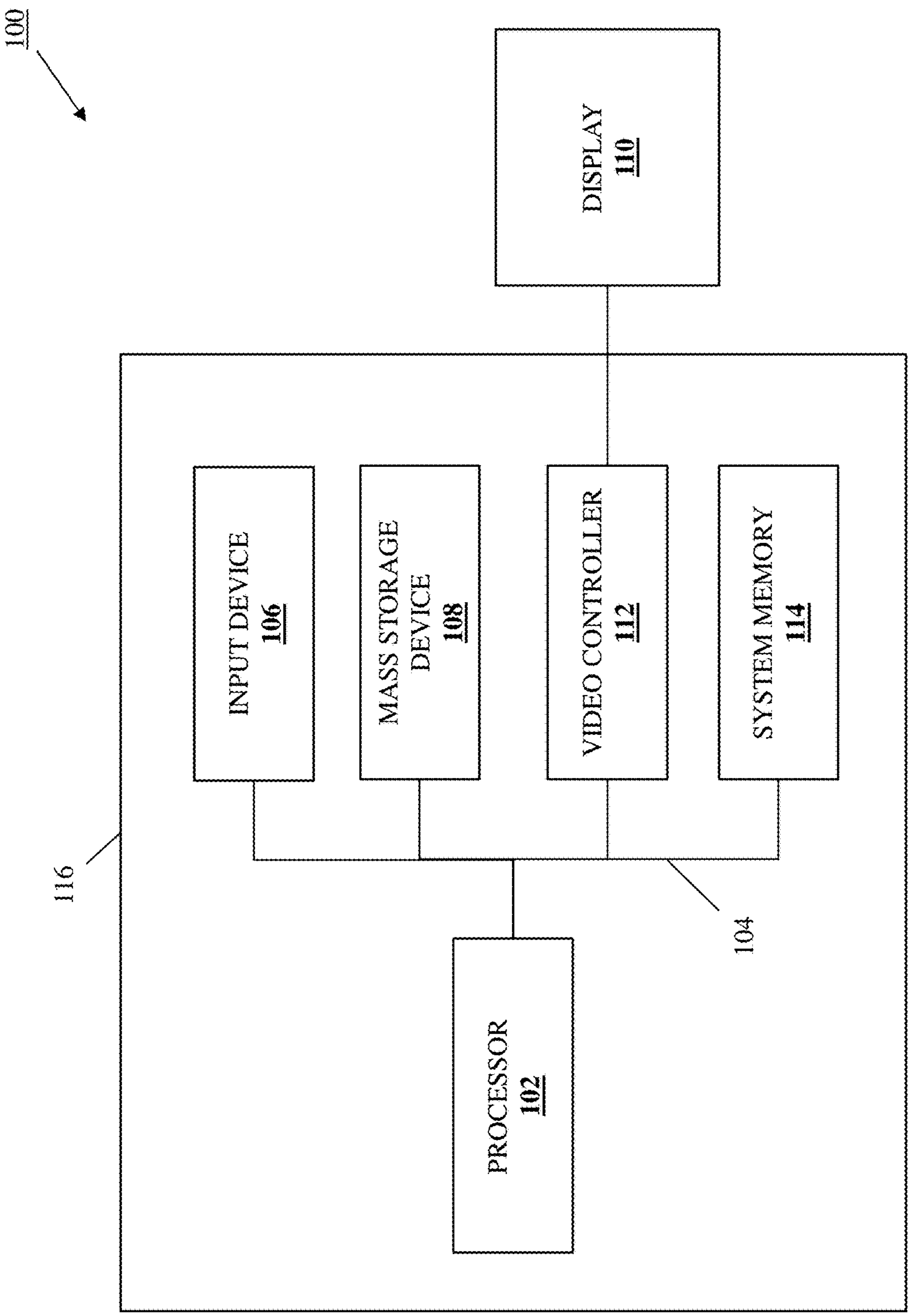
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
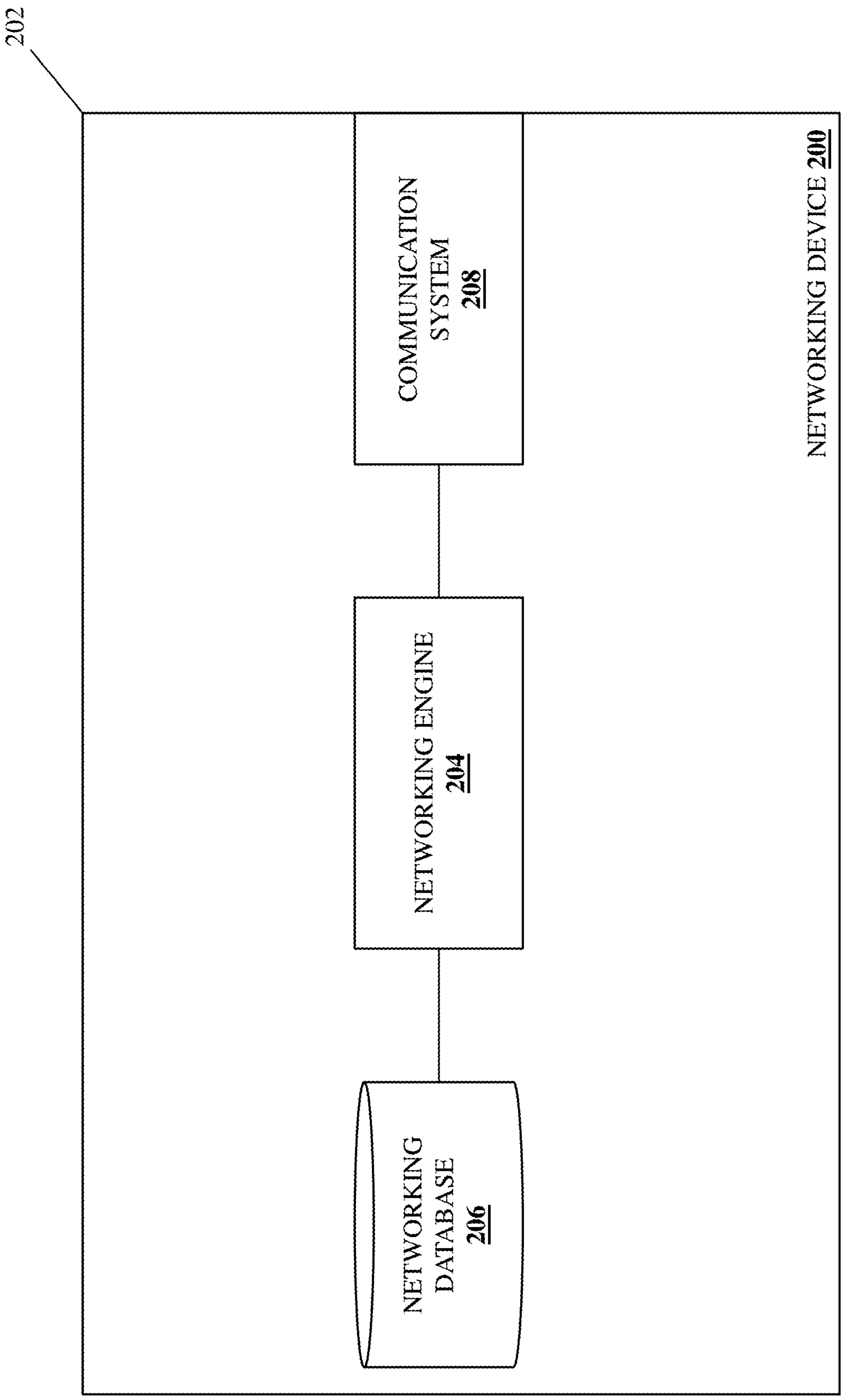
FIG. 2 is a schematic view illustrating an embodiment of a networking device that may be used with the connector fastener extension system of the present disclosure.

Referring now to FIG. 2, an embodiment of a networking device 200 is illustrated that may be used with the connector fastener extension system of the present disclosure. In the illustrated embodiment, the networking device 200 may be provided by the IHS 100 discussed above with reference to FIG. 1, and/or may include some or all of the components of the IHS 100, and in specific examples, may be provided by a switch device, a router device, and/or other networking devices known in the art. However, while illustrated and discussed as being provided by a networking device, one of skill in the art in possession of the present disclosure will appreciate that the functionality of the networking device 200 discussed below may be provided by other devices (e.g., server devices and/or other computing devices known in the art) that are configured to operate similarly as the networking device 200 discussed below. In the illustrated embodiment, the networking device 200 includes a chassis 202 that houses the components of the networking device 200, only some of which are illustrated and discussed below. For examples, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a networking engine 204 that is configured to transmit data via the cabling systems described below, and/or perform other functionality of networking engines and/or networking devices that would be apparent to one of skill in the art in possession of the present disclosure.

The chassis 202 may also house a storage system (not illustrated, but which may include the storage device 108 discussed above with reference to FIG. 1) that is coupled to the networking engine 204 (e.g., via a coupling between the storage system and the processing system) and that includes a networking database 206 that is configured to store any of the information utilized by the networking engine 204. The chassis 202 may also house a communication system 208 that is coupled to the networking engine 204 (e.g., via a coupling between the communication system and the processing system) and that may be provided by a Network Interface Controller (NIC) and/or any of a variety of other networking communication components that would be apparent to one of skill in the art in possession of the present disclosure. As discussed below, the communication system 208 may include networking device connectors and/or other computing device connectors that are configured to connect to cabling systems that include the connector fastener extension system of the present disclosure. However, while a specific networking device 200 has been illustrated and described, one of skill in the art in possession of the present disclosure will appreciate that networking devices (and other devices that utilize the cabling systems of the present disclosure) may include different components and/or component configurations while remaining within the scope of the present disclosure as well.

Figure 3:
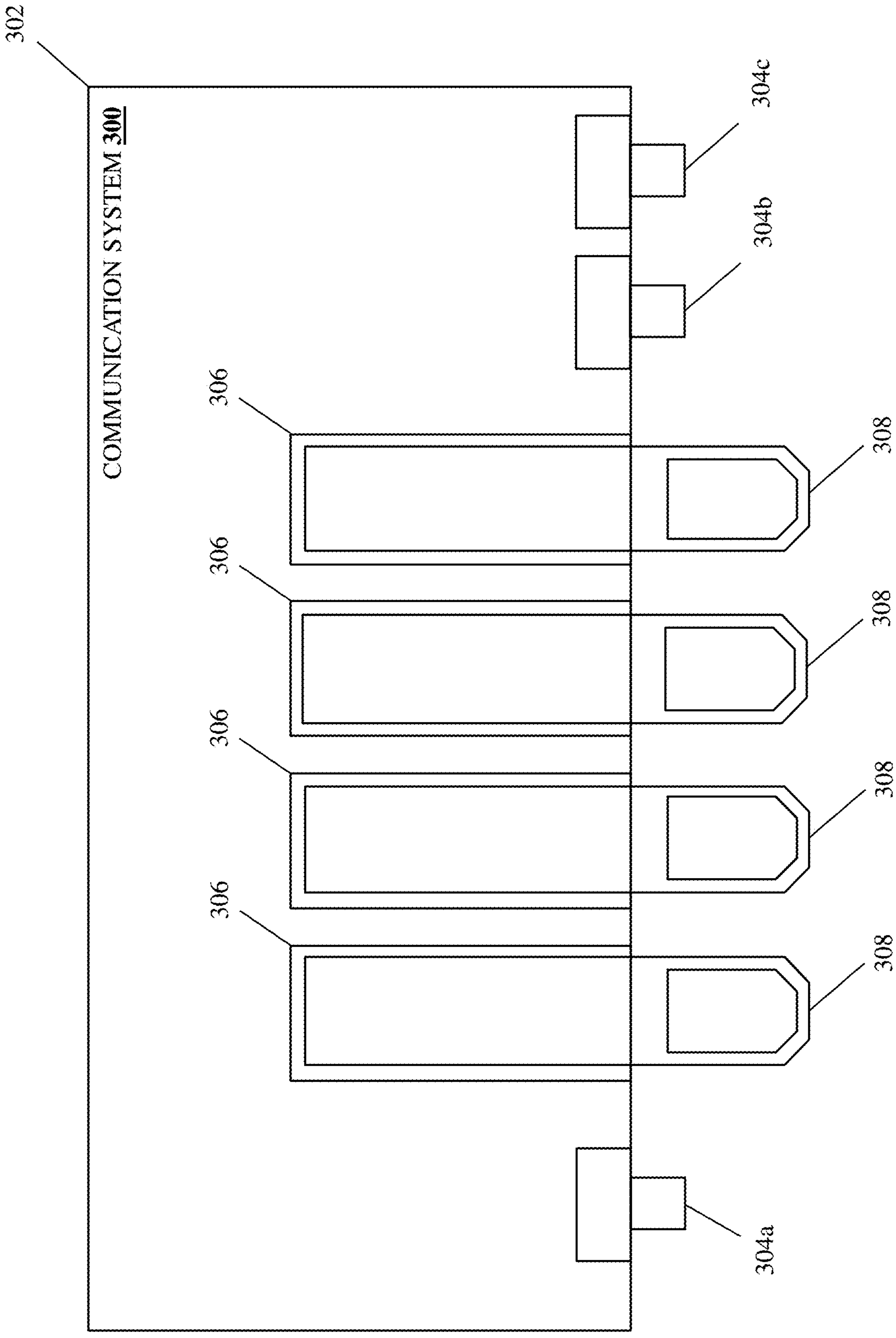
FIG. 3 is a schematic top view illustrating an embodiment of a communication device that may be included in the networking device of FIG. 2.

Referring now to FIG. 3, an embodiment of a communication system 300 is illustrated that may provide the communication system 208 discussed above with reference to FIG. 2. In the illustrated embodiment, the communication system 300 includes a chassis 302 (e.g., a circuit board) that includes the components of the communication system 300, only some of which are illustrated and discussed below. For example, the chassis 302 may include a plurality of networking device connectors 304*a*, 304*b*, and 304*c* that are configured to connect to a cabling system that includes the connector fastener extension system of the present disclosure in order to allow data to be transmitted between a networking device (e.g., the networking device 208) and other computing devices. However, while described as networking device connectors, one of skill in the art in possession of the present disclosure will appreciate how the communication system 300 may include other computing device connectors for connecting to a cabling system that includes the connector fastener extension system of the present disclosure while remaining within the scope of the present disclosure as well.

In some embodiments and as illustrated and discussed in further detail below, the networking device connectors 304*a*-304*c* may be configured on the chassis 302 in a vertical stacked formation (e.g., with additional networking device connectors 304*a*-304*c* located adjacent and underneath the illustrated networking device connector 304*a*-304*c* in FIG. 3). In the illustrated embodiment, the chassis 302 also includes a plurality of transceiver device ports 306 that are positioned between the computing device connectors 304*a* and 304*b* and that are configured to receive transceiver devices 308 in order to allow data to be transmitted between a networking device (e.g., the networking device 208) and other computing devices. However, while a specific example of a communication system 300 has been illustrated and described, one of skill in the art in possession of the present disclosure will appreciate how communication systems may include other connectors and/or connector configurations while remaining within the scope of the present disclosure.

Figure 4A:
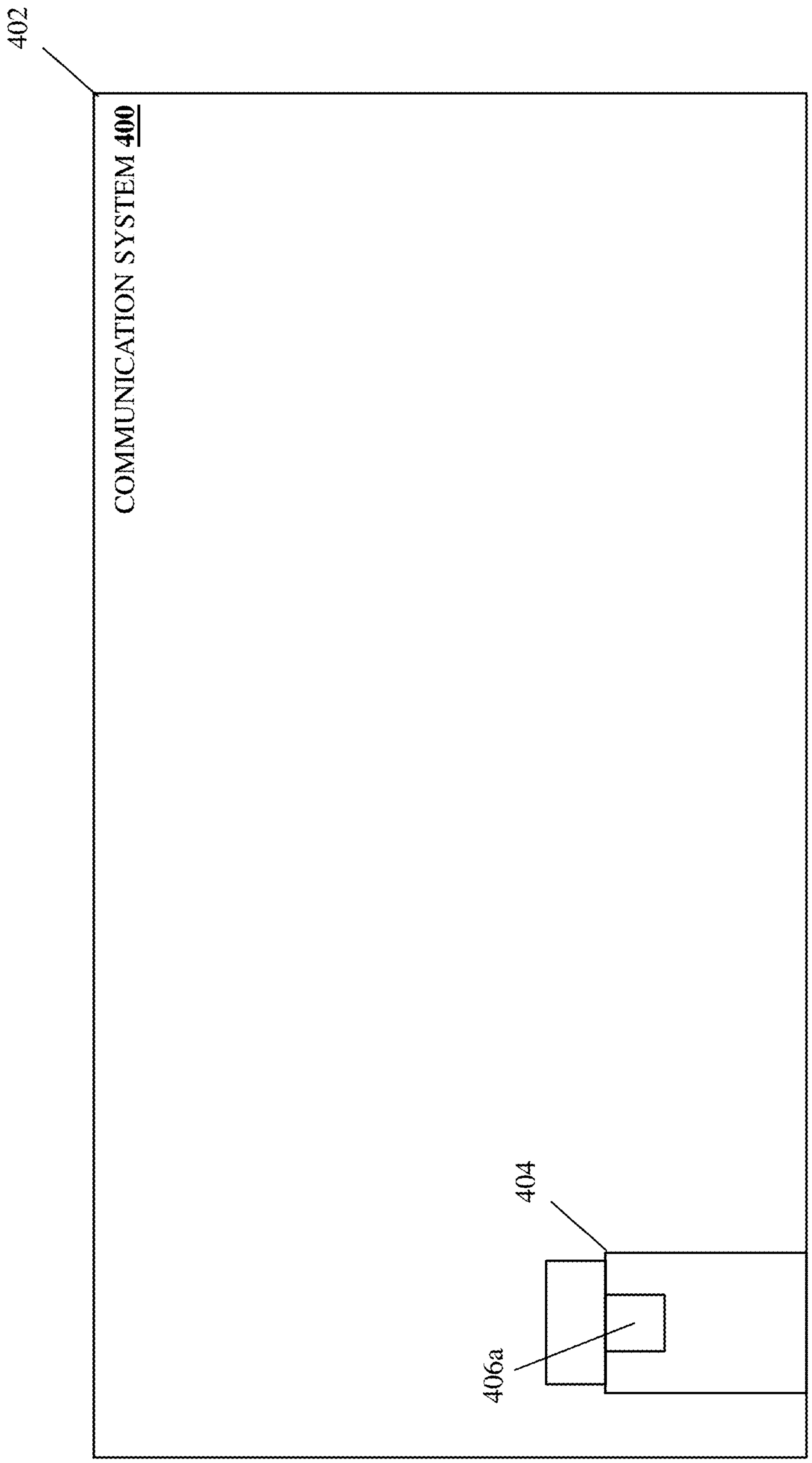
FIG. 4A is a schematic top view illustrating an embodiment of a communication device that may be included in the networking device of FIG. 2.
Figure 4B:
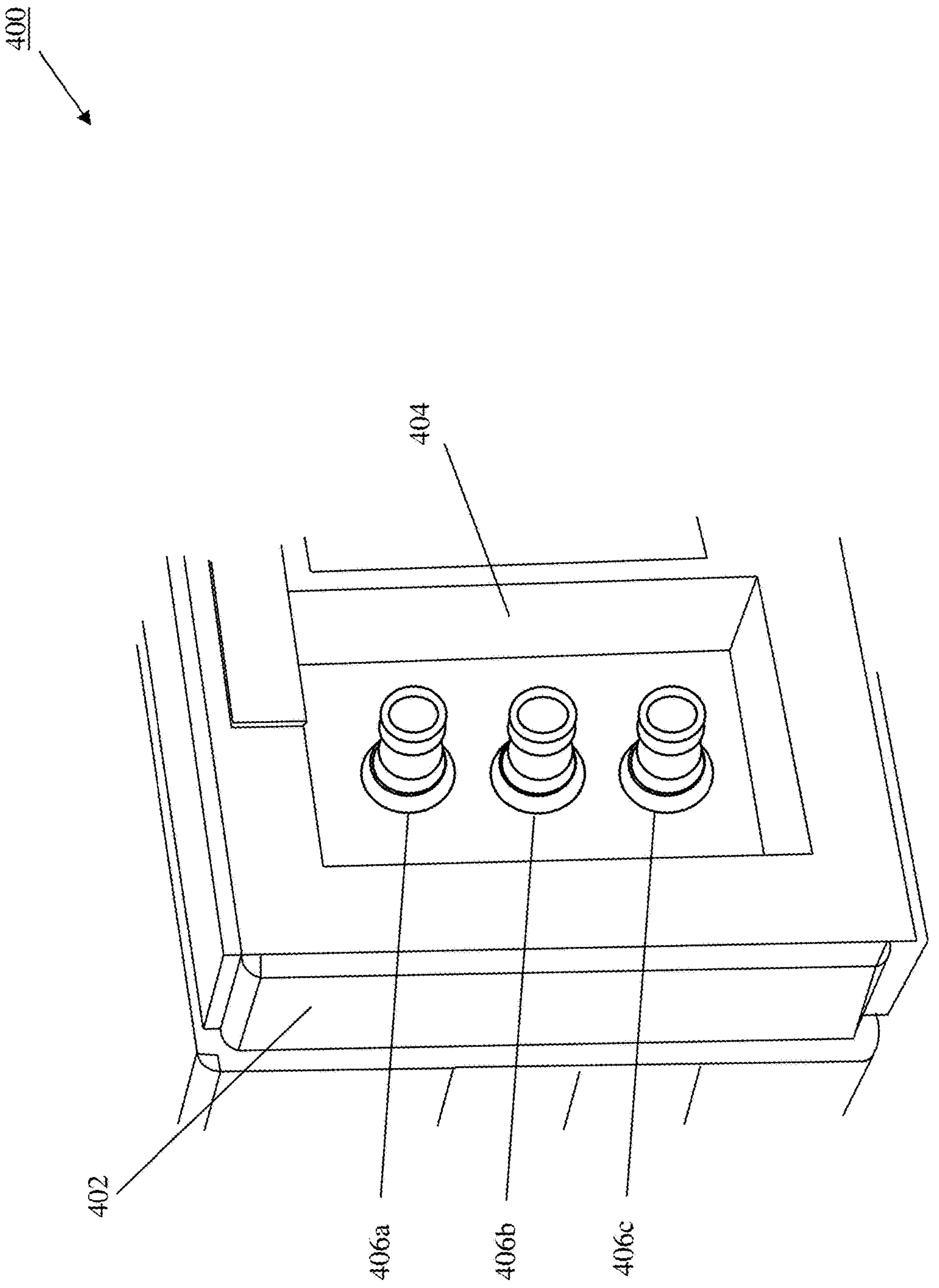
FIG. 4B is a perspective view illustrating an embodiment of the communication device of FIG. 4A.

Referring now to FIGS. 4A and 4B, an embodiment of a communication system 400 is illustrated that may provide the communication system 208 discussed above with reference to FIG. 2. With reference to FIG. 4A, in the illustrated embodiment, the communication system 400 (e.g., a circuit board is provided in a chassis 402 (e.g., the chassis 202 of the networking device 200 discussed above) and includes the components of the communication system 400, only some of which are illustrated and discussed below. For example, the chassis 402 may define a recessed section 404, and one or more networking device connectors on the communication system 400 may be provided in the recessed section 404 and configured to connect to a cabling system that includes the connector fastener extension system of the present disclosure in order to allow data to be transmitted between a networking device (e.g., the networking device 208) and other computing devices.

For example, FIGS. 4A and 4B illustrated how a plurality of networking device connectors 406*a*, 406*b*, and 406*c* may be provided in the recessed section 404 of the chassis 402 in a vertical stacked formation. However, while described as networking device connectors, one of skill in the art in possession of the present disclosure will appreciate how the communication system 400 may include other computing device connectors for connecting to a cabling system that includes the connector fastener extension system of the present disclosure while remaining within the scope of the present disclosure as well. Furthermore, while a specific example of a communication system 400 has been illustrated and described, one of skill in the art in possession of the present disclosure will appreciate how communication systems may include other connectors and/or connector configurations while remaining within the scope of the present disclosure.

Figure 5A:
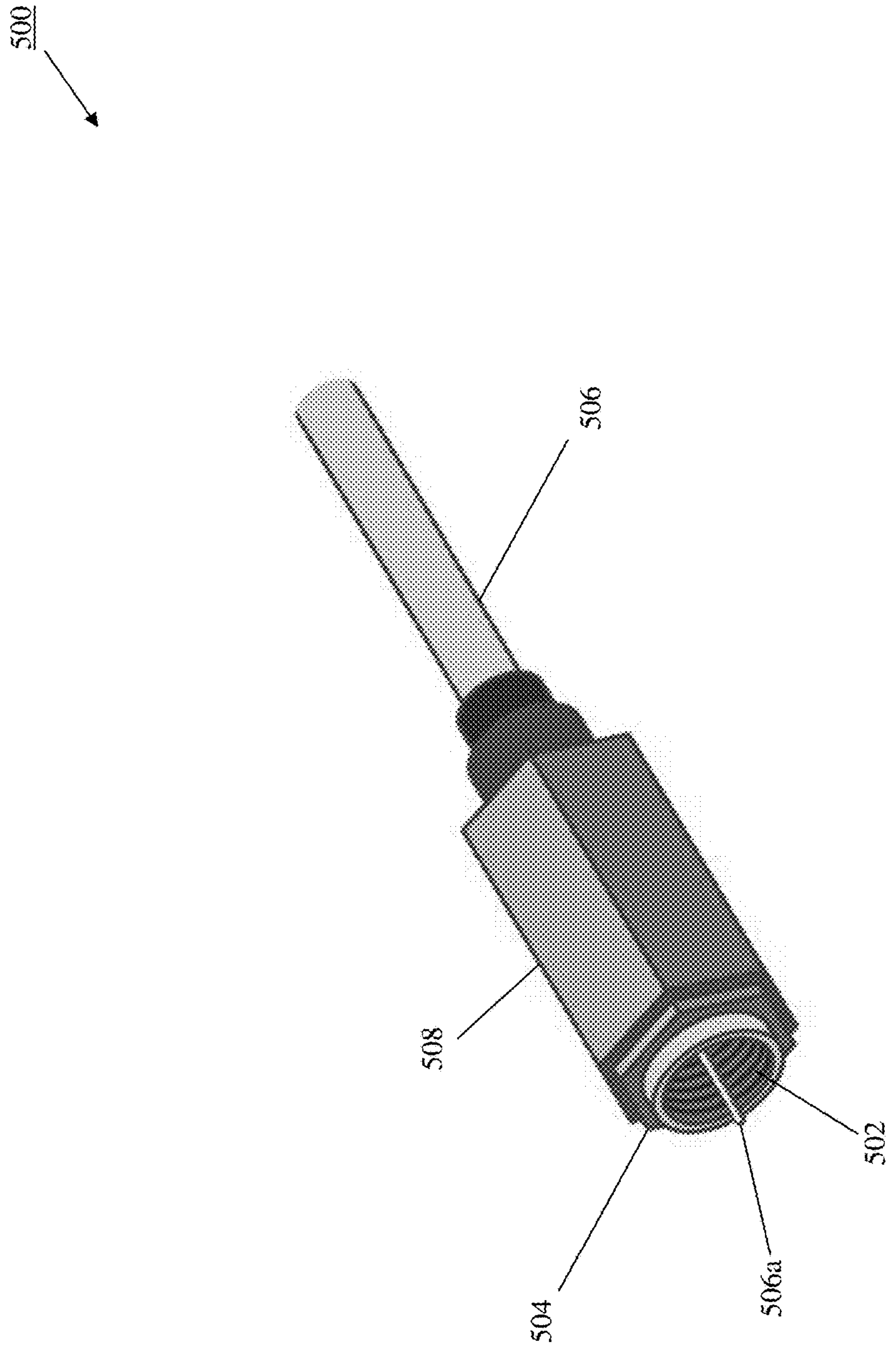
FIG. 5A is a perspective view illustrating an embodiment of a cabling system that includes the connector fastening extension system of the present disclosure.
Figure 5B:
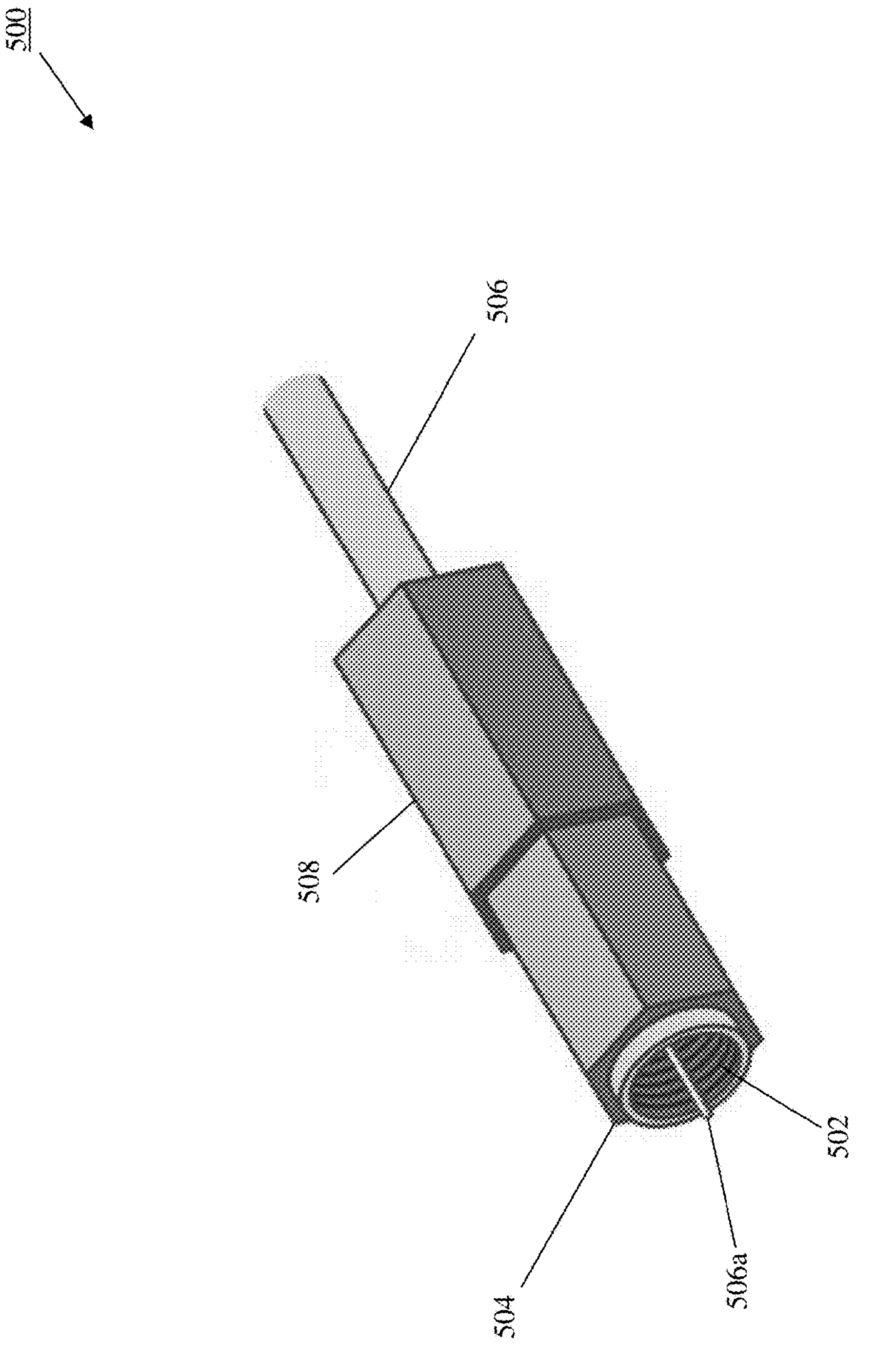
FIG. 5B is a perspective view illustrating an embodiment of the operation of the connector fastening extension system on the cabling system of FIG. 5A.

Referring now to FIGS. 5A and 5B, an embodiment of a cabling system 500 is illustrated that may include an integrated connector fastener extension system provided according to the teachings of the present disclosure on at least one end of its cable. With reference to FIG. 5A, in the illustrated embodiment, the cabling system 500 includes a cable connector 502 having an integrated fastener base 504. The cable connector 502 defines a connector channel and, in the illustrated embodiment, includes a threaded interior surface that is located immediately adjacent the connector channel and that is configured to connect to a networking device connector, discussed in further detail below. In a specific example, the cable connector 502 may be provided by a SubMiniature version A (SMA) cable connector, although one of skill in the art in possession of the present disclosure will appreciate how the cable connector 502 may be provided by other types of cable connectors while remaining within the scope of the present disclosure as well. In some embodiments, the fastener base 504 may include a polygonal perimeter, and while the specific examples provided below utilize a hexagonal perimeter, one of skill in the art in possession of the present disclosure will appreciate how other polygonal perimeters will fall within the scope of the present disclosure.

The cabling system 500 also includes a cable 506 that extends from the cable connector 502 and the fastener base 504, and that includes a conductor pin 506*a* (e.g., a center core conductor pin) that extends from the cable 506, through the connector channel defined by the cable connector 502, and out of the cable connector 502. A fastener extension member 508 is moveably coupled to the fastener base 504 to provide the integrated connector fastener extension system on the cabling system 500, and as illustrated in FIGS. 5A and 5B and discussed in further detail below, is configured to move relative to the fastener base 504, away from the cable connector 502, and towards the cable 506. In the specific example illustrated in FIGS. 5A and 5B, the fastener extension member 508 includes a telescoping moveable coupling to the fastener base 504 that may include any of a variety of telescoping moveable coupling components and/or configurations that one of skill in the art in possession of the present disclosure would recognize as providing the telescoping functionality discussed below. However, while a specific type of moveable coupling is illustrated and described, one of skill in the art in possession of the present disclosure will appreciate how other movable couplings will fall within the scope of the present disclosure as well.

In some embodiments, the connector fastener extension system provided on the cabling system 500 may include locking features to prevent movement of the fastener extension member 508 relative to the fastener base 504. For example, the fastener extension member 508 may include a locking element (not visible in FIG. 5A) that is configured to engage a corresponding locking element on the fastener base 504 when the fastener extension member 508 is extended as illustrated in FIG. 5B, and/or when the fastener extension member 508 is not extended as illustrated in FIG. 5A, to prevent movement of the fastener extension member 508 relative to the fastener base 504. Furthermore, the locking features discussed above may also include a release member (not visible in FIG. 5A, but which may be accessible on either of the fastener base 504 and/or the fastener extension member 508) that is configured to disengage the locking elements on the fastener base 504 and the fastener extension member 508 to allow the fastener extension member to move relative to fastener base 504 as discussed in further detail below.

In some embodiments, the fastener extension member 508 may include a polygonal perimeter, and while the specific examples provided below utilize a hexagonal perimeter, one of skill in the art in possession of the present disclosure will appreciate how other polygonal perimeters will fall within the scope of the present disclosure as well. As will be appreciated by one of skill in the art in possession of the present disclosure and as discussed in further detail below, the corresponding polygonal perimeters of the fastener base 504 and the fastener extension member 508 interlock those two components such that rotation of the fastener extension member 508 causes rotation of the fastener base 504. However, while a specific example of a connector fastener extension system has been illustrated and described, the connector fastener extension system of the present disclosure may include a variety of different components and/or component configurations while remaining within the scope of the present disclosure as well.

Figure 6A:
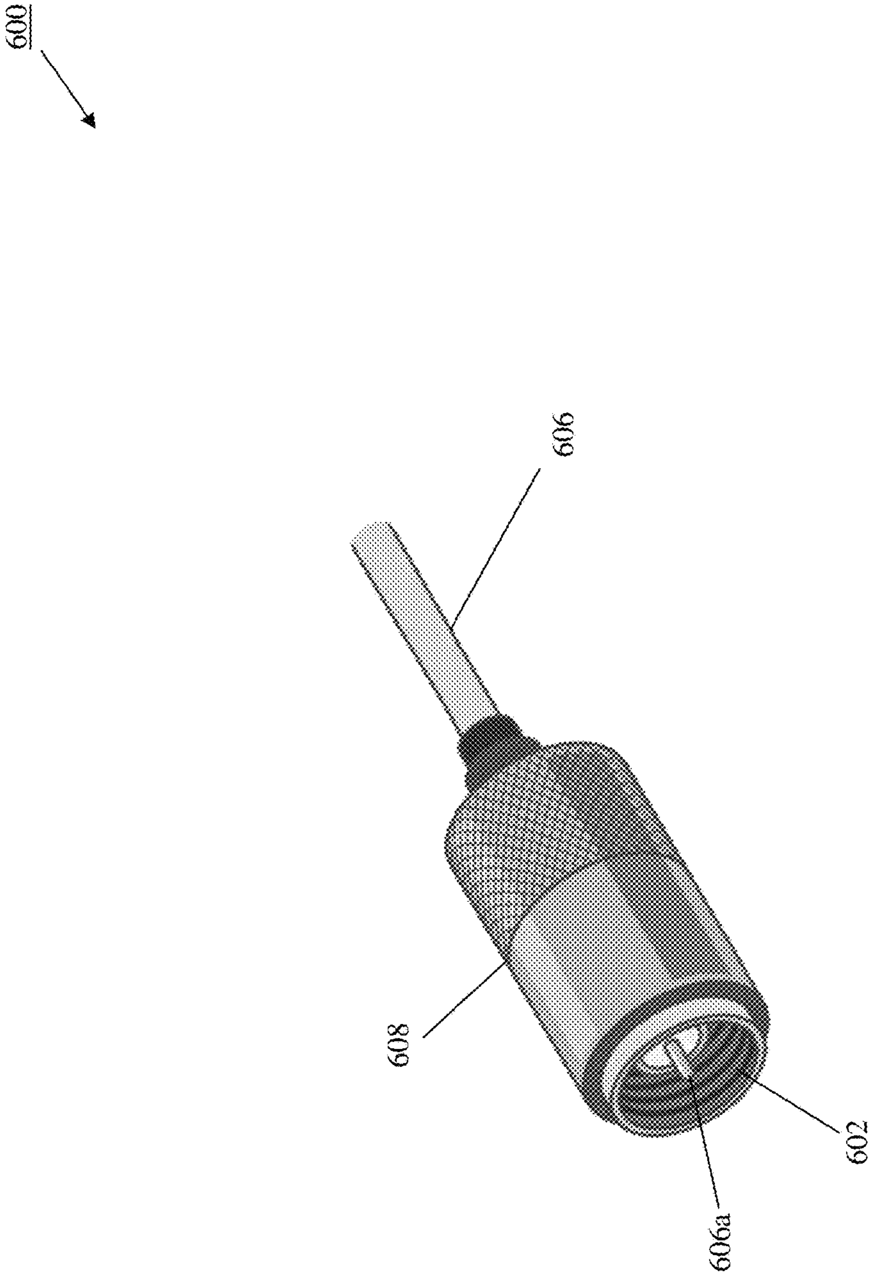
FIG. 6A is a perspective view illustrating an embodiment of a cabling system that includes the connector fastening extension system of the present disclosure.
Figure 6B:
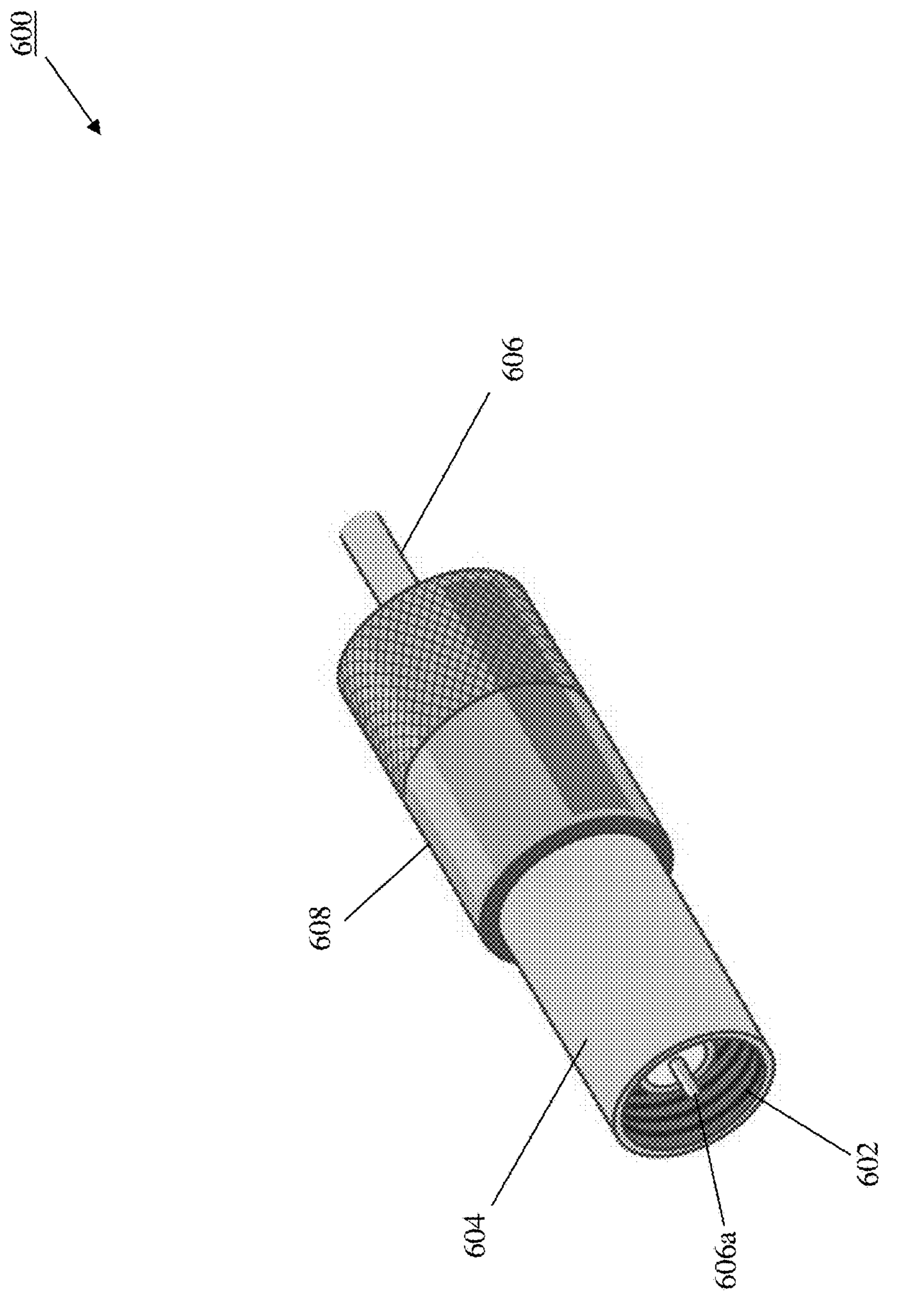
FIG. 6B is a perspective view illustrating an embodiment of the operation of the connector fastening extension system on the cabling system of FIG. 6A.

For example, referring to FIGS. 6A and 6B, another embodiment of a cabling system 600 is illustrated that may include an integrated connector fastener extension system provided according to the teachings of the present disclosure on at least one end of its cable. With reference to FIGS. 6A and 6B, in the illustrated embodiment, the cabling system 600 includes a cable connector 602 having an integrated fastener base 604. The cable connector 602 defines a connector channel and, in the illustrated embodiment, includes a threaded interior surface that is located immediately adjacent the connector channel and that is configured to connect to a networking device connector, discussed in further detail below. In a specific example, the cable connector 602 may be provided by an SMA cable connector, although one of skill in the art in possession of the present disclosure will appreciate how the cable connector 602 may be provided by other types of cable connectors while remaining within the scope of the present disclosure as well. In the illustrated embodiment, the fastener base 604 includes a circular perimeter.

The cabling system 600 also includes a cable 606 that extends from the cable connector 602 and the fastener base 604, and that includes a conductor pin 606*a* (e.g., a center core conductor pin) that extends from the cable 606, through the connector channel defined by the cable connector 602, and out of the cable connector 602. A fastener extension member 608 is moveably coupled to the fastener base 604 to provide the integrated connector fastener extension system on the cabling system 600, and as illustrated in FIGS. 6A and 6B and discussed in further detail below, is configured to move relative to the fastener base 604, away from the cable connector 602, and towards the cable 606. In the specific example illustrated in FIGS. 6A and 6B, the fastener extension member 608 includes a telescoping moveable coupling to the fastener base 604 that is described in further detail below, but while a specific example is provided herein, one of skill in the art in possession of the present disclosure will appreciate how the telescoping moveable coupling may include any of a variety of telescoping moveable coupling components and/or configurations that one of skill in the art in possession of the present disclosure would recognize as providing the telescoping functionality discussed below. Furthermore, while a specific type of moveable coupling is illustrated and described, one of skill in the art in possession of the present disclosure will appreciate how other movable couplings will fall within the scope of the present disclosure as well.

In the illustrated embodiment, the fastener extension member 608 includes a circular perimeter, and the fastener base 604 and the fastener extension member 608 may be configured to interlock such that the rotation of the fastener extension member 608 causes the rotation of the fastener base 604. For example, referring now to FIGS. 6C and 6D, the fastener base 604 may include a front section 604*a*, a rear section 604*b* that is located opposite the fastener base 604 from the front section, and a plurality of interlock sections 604*c* that are located adjacent the rear section 604*b* of the fastener base 604 in a spaced apart orientation about the perimeter of the fastener base 604 from each other.

Figure 6C:
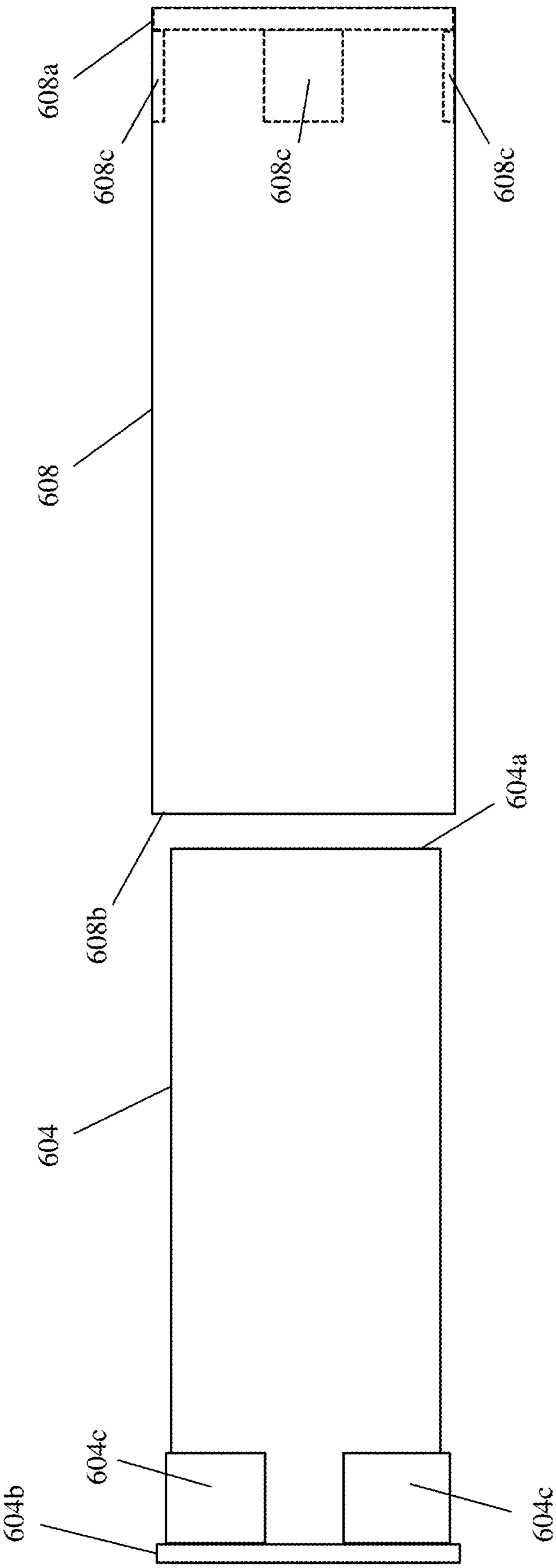
FIG. 6C is a schematic side view illustrating an embodiment of the connector fastening extension system on the cabling system of FIGS. 6A and 6B.
Figure 6D:
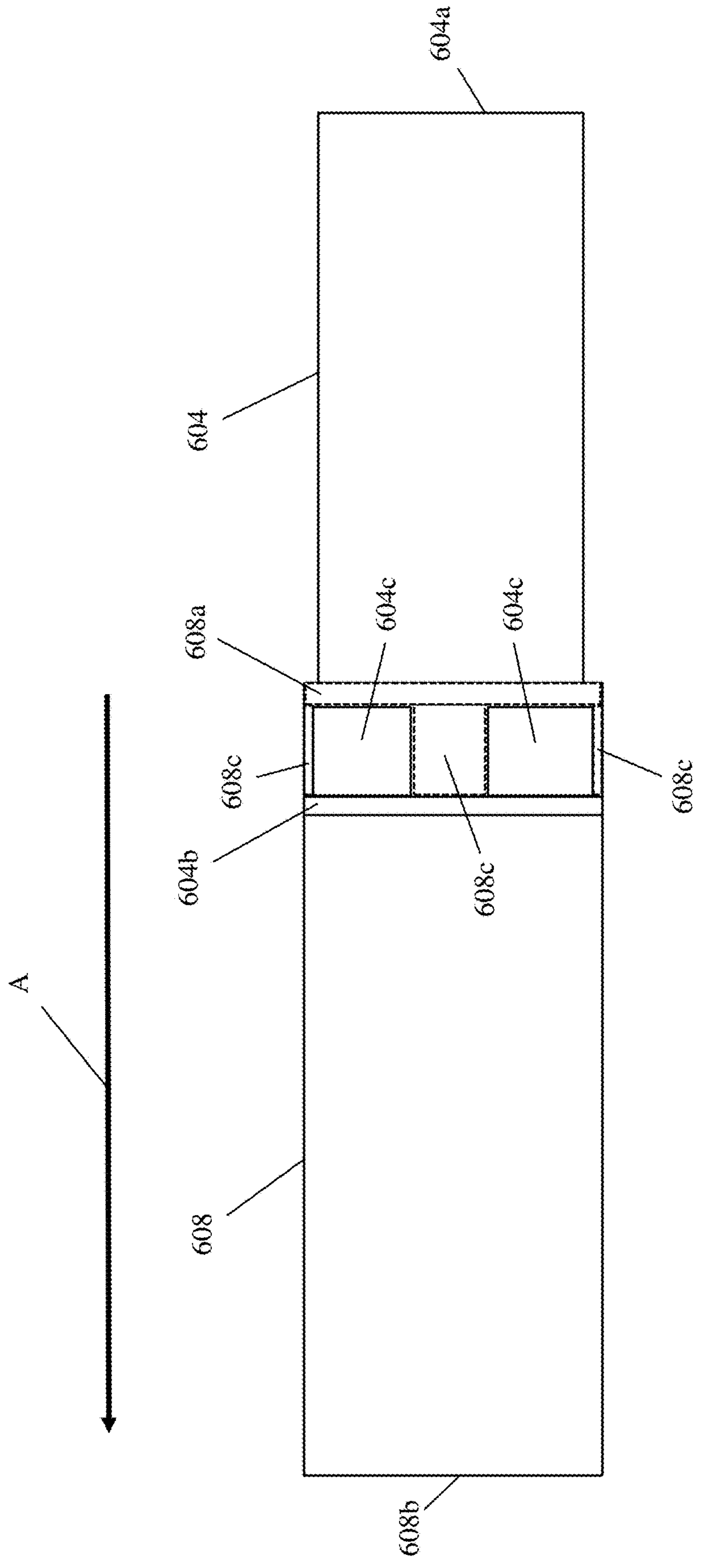
FIG. 6D is a schematic side view illustrating an embodiment of the connector fastening extension system on the cabling system of FIGS. 6A and 6B.

Furthermore, the fastener extension member 608 may include a front section 608*a*, a rear section 608*b* that is located opposite the fastener extension member 608 from the front section 608*a*, and a plurality of interlock sections 608*c* that are located adjacent the front section 608*a* of the fastener extension member 608 in a spaced apart orientation about the perimeter of the fastener extension member 608 from each other. As can be seen in FIGS. 6C and 6D, the interlock sections 608*c* on the fastener extension member 608 are configured to interlock with the interlock sections 604*c* on the fastener base 604 when the fastener extension member 608 moves in a telescoping motion relative to the fastener base 604 and in a direction A in order to prevent relative rotational movement of the fastener base 604 and the fastener extension member 608. Furthermore, similarly as described above for the connector fastener extension system on the cabling system 500, the fastener base 604 and the fastener extension member 608 may include locking features to prevent movement of the fastener extension member 608 relative to the fastener base 604 when the fastener extension member 608 has been extended from the cable connector 602 into the orientation illustrated in FIG. 6B, and/or when the fastener extension member 608 is not extended as illustrated in FIG. 6A, as well as the release member discussed above that allows the fastener extension member 608 to move relative to the fastener base 604 subsequent to the locking of the two. However, while a specific example of a connector fastener system has been illustrated and described, the connector fastener system of the present disclosure may include a variety of different components and/or component configurations while remaining within the scope of the present disclosure as well.

Figure 7A:
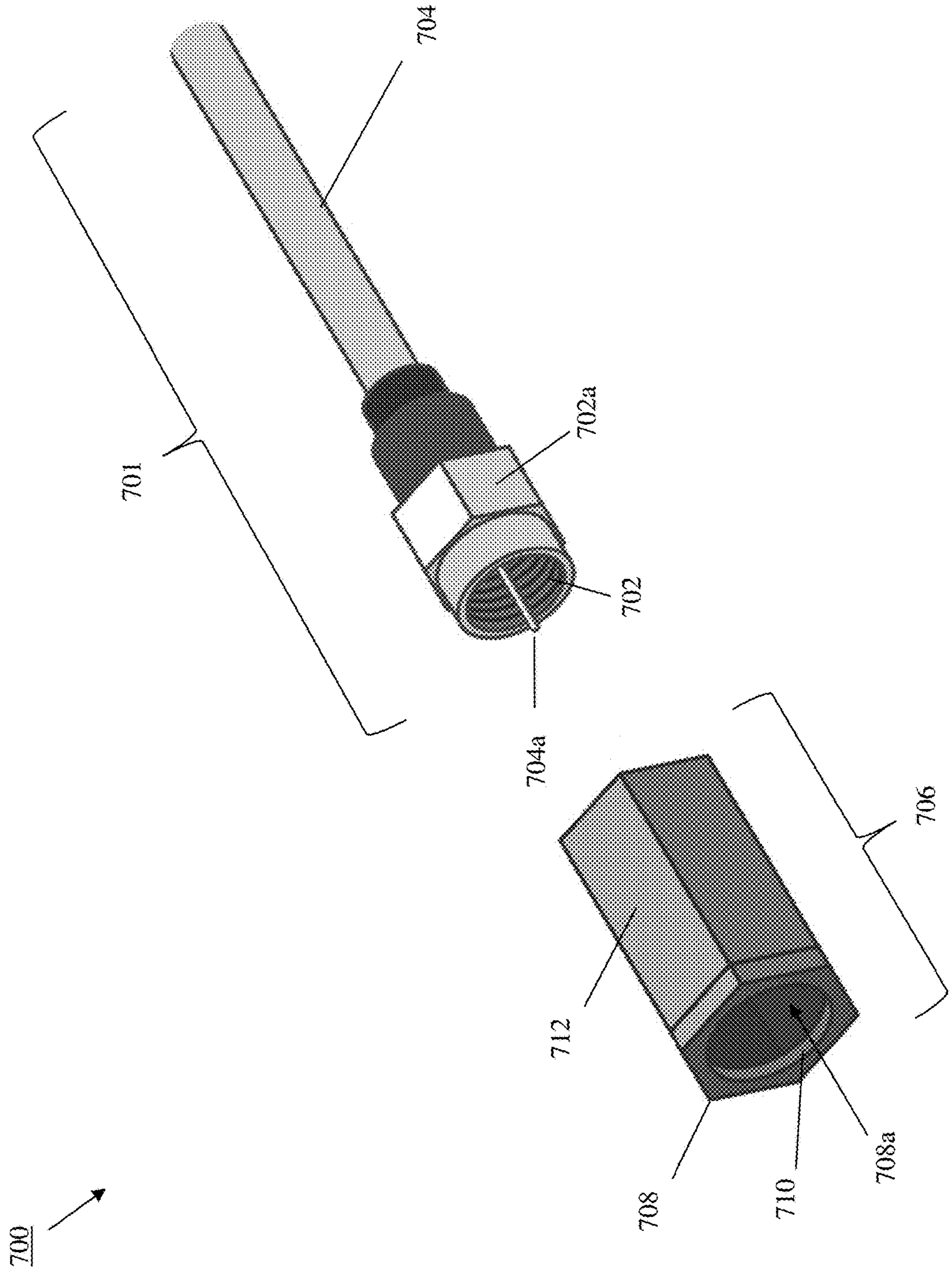
FIG. 7A is a perspective view illustrating an embodiment of a cabling system and the connector fastening extension system of the present disclosure.
Figure 7B:
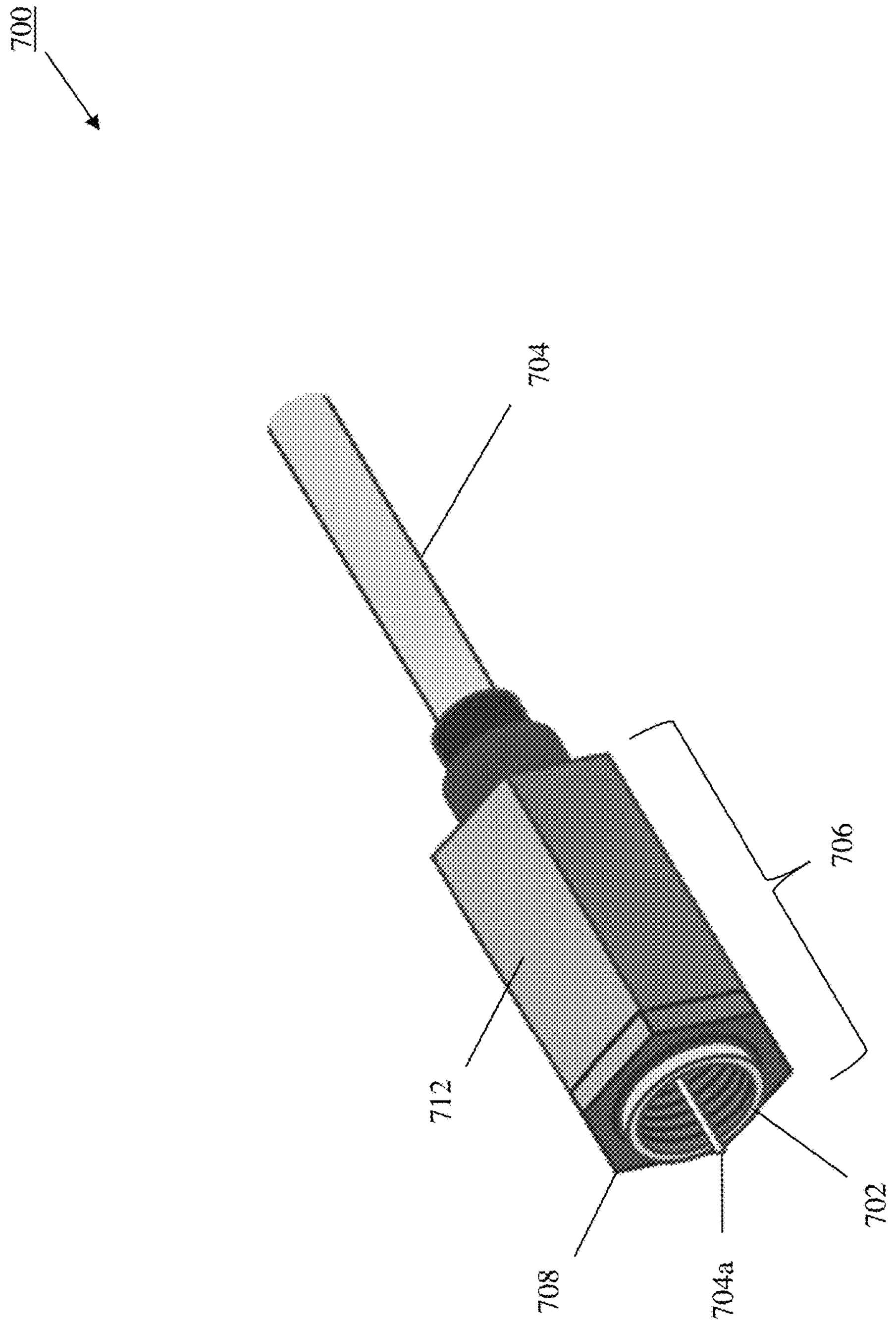
FIG. 7B is a perspective view illustrating an embodiment of the connector fastening extension system provided on the cabling system of FIG. 7A.
Figure 7C:
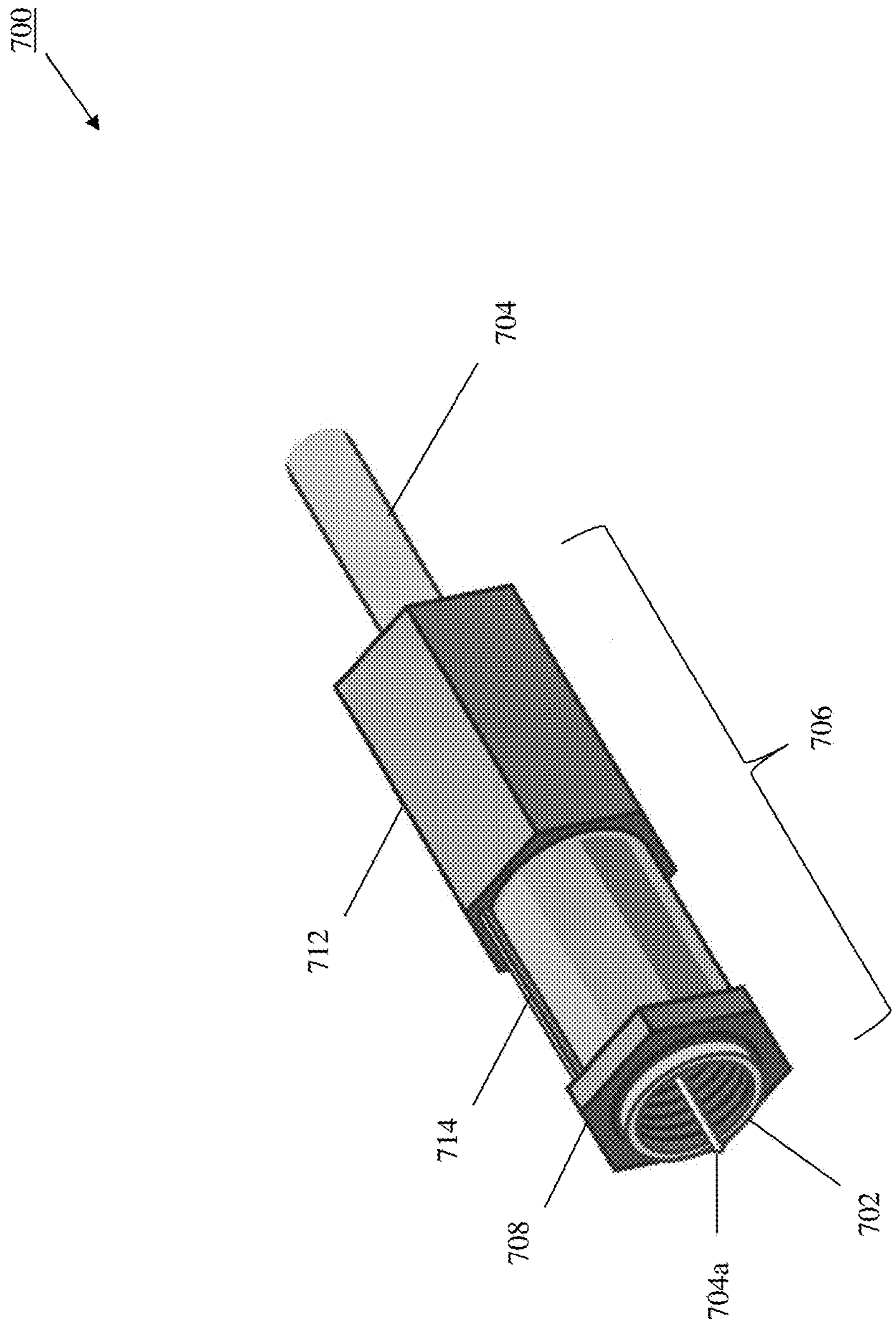
FIG. 7C is a perspective view illustrating an embodiment of the operation of the connector fastening extension system on the cabling system of FIG. 7B.

For example, referring now to FIGS. 7A, 7B and 7C, a cabling system 700 is illustrated that may include an attachable connector fastener extension system that may be provided according to the teachings of the present disclosure and attached to at least one end of its cable. With reference to FIG. 7A, in the illustrated embodiment, the cabling system 700 includes cabling 701 having a cable connector 702 and a cable 704 that extends from the cable connector 702. As will be appreciated by one of skill in the art in possession of the present disclosure, the cabling 701 may be provided by conventional cabling with, for example, the cable connector 702 provided by an SMA cable connector and the cable provided by coaxial cable. However, while particular cabling has been described, one of skill in the art in possession of the present disclosure will appreciate how the cabling 701 may be provided by other types of cabling while remaining within the scope of the present disclosure as well.

In the illustrated embodiment, the cable connector 702 includes a cable connector base 702*a* having a polygonal perimeter (e.g., a hexagonal perimeter in the illustrated embodiment), and the cable connector base 702*a* defines a connector channel that, in the illustrated embodiment, includes a threaded interior surface that is located immediately adjacent the connector channel and that is configured to connect to a networking device connector, discussed in further detail below. Furthermore, the cable 704 extends from the cable connector 702 and includes a conductor pin 704*a* (e.g., a center core conductor pin) that extends from the cable 704, through the connector channel defined by the cable connector 702, and out of the cable connector 702. As will be appreciated by one of skill in the art in possession of the present disclosure, the cable connector 702/cable connector base 702*a* may be configured to rotate relative to the cable in order to connect to the networking device connector as discussed in further detail below.

With reference to FIG. 7A, in the illustrated embodiment, the cabling system 700 also includes an attachable connector fastener extension system 706 having a fastener base 708 that defines a cable connector housing 708*a* that extends through the fastener base 708, along with a cable connector aperture 710 that is located adjacent the cable connector housing 708*a*. In some embodiments, the fastener base 708 and the cable connector housing 708*a* defined therein may each include a polygonal perimeter, and while the specific examples provided below utilize a hexagonal perimeter, one of skill in the art in possession of the present disclosure will appreciate how other polygonal perimeters will fall within the scope of the present disclosure as well.

The attachable connector fastener extension system 706 also includes a fastener extension member 712 that is moveably coupled to the fastener base 708, and as illustrated in FIGS. 7B and 7C and discussed in further detail below, is configured to move relative to the fastener base 708. In the specific examples illustrated in FIGS. 7B and 7C, the fastener extension member 712 includes a telescoping moveable coupling to the fastener base 708 that may include any of a variety of telescoping moveable coupling components and/or configurations that one of skill in the art in possession of the present disclosure would recognize as providing the telescoping functionality discussed below. However, while a specific type of moveable coupling is illustrated and described, one of skill in the art in possession of the present disclosure will appreciate how other movable couplings will fall within the scope of the present disclosure as well.

In some embodiments, the fastener extension member 712 may include a polygonal perimeter, and while the specific examples provided below utilize a hexagonal perimeter, one of skill in the art in possession of the present disclosure will appreciate how other polygonal perimeters will fall within the scope of the present disclosure as well. As will be appreciated by one of skill in the art in possession of the present disclosure and as discussed in further detail below, the corresponding polygonal perimeters of the fastener base 708 and the fastener extension member 712 interlock those two components such that rotation of the fastener extension member 712 causes rotation of the fastener base 708. However, while a specific example of an attachable connector fastener extension system has been illustrated and described, the attachable connector fastener extension system of the present disclosure may include a variety of different components and/or component configurations while remaining within the scope of the present disclosure as well As illustrated in FIGS. 7A and 7B, the fastener base 708 is configured to receive the cable connector 702 to connect the fastener base 708 with the cable connector 702 by positioning the cable connector 702 in the cable connector housing 708*a* such that at least a portion of the cable connector 702 extends through the cable connector aperture 710, and in some embodiments the fastener base 708 may include cable connector securing features that are configured to secure the cable connector 702 in the fastener base 708. As will be appreciated by one of skill in the art in possession of the present disclosure, the corresponding polygonal perimeters (e.g., hexagonal perimeters in the illustrated embodiment) of the cable connector base 702*a* and the cable connector housing 708 interlock the cable connector base 702*a* with the fastener base 708 such that rotation of the fastener base 708 causes rotation of the cable connector base 702*a*.

As discussed above and as illustrated in FIGS. 7B and 7C, the fastener extension member 712 is moveably coupled to the fastener base 708 such that it is configured to move away from the cable connector 702 and towards the cable 704 when the cable connector 702 is connected to the fastener base 708. In the illustrated embodiment, an interlock member 714 is provided on the fastener base 708 and engages an interlock channel defined by the fastener extension member 712 to prevent relative rotational movement of the fastener base 708 and the fastener extension member 712, although one of skill in the art in possession of the present disclosure will appreciate how other techniques for preventing relative rotational movement of the fastener base 708 and the fastener extension member 712 will fall within the scope of the present disclosure as well.

Furthermore, similarly as described above for the connector fastener extension system on the cabling system 500, the fastener base 708 and the fastener extension member 712 may include locking features to prevent movement of the fastener extension member 712 relative to the fastener base 708 when the fastener extension member 712 has been extended from the cable connector 702 into the orientation illustrated in FIG. 7C, and/or when the fastener extension member 712 is not extended as illustrated in FIG. 7B, as well as the release member discussed above that allows the fastener extension member 712 to move relative to the fastener base 708 subsequent to the locking of the two. However, while a specific example of the connector fastener extension system has been illustrated and described, the connector fastener extension system of the present disclosure may include a variety of different components and/or component configurations while remaining within the scope of the present disclosure as well.

Figure 8:
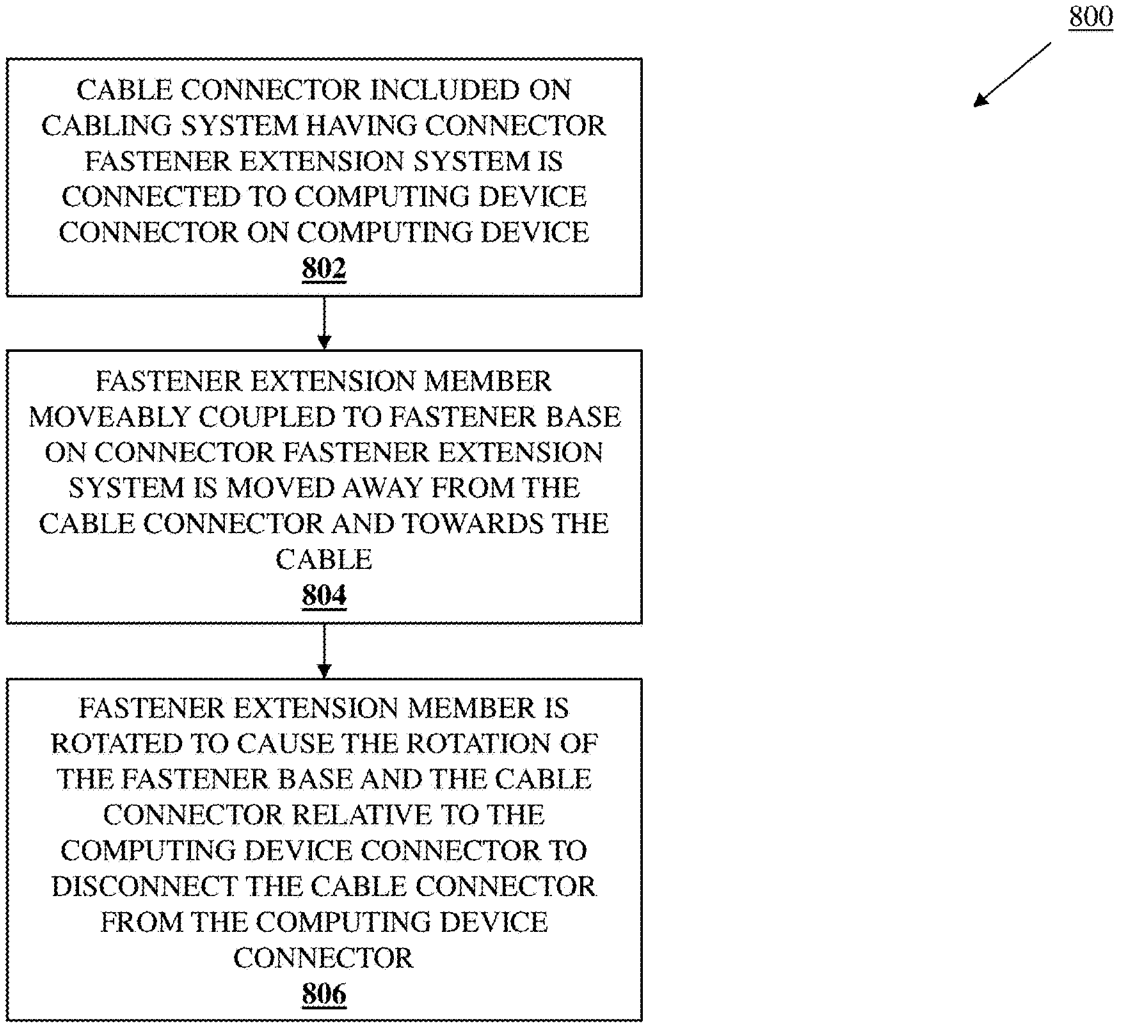
FIG. 8 is a flow chart illustrating an embodiment of a method for extending a connector fastener on a cabling system.

Referring now to FIG. 8, an embodiment of a method 800 for extending a connector fastener is illustrated. As discussed below, the systems and methods of the present disclosure provide for the extension of a connector fastener to facilitate the fastening and/or unfastening of a cable connector with a computing device connector. For example, the connector fastener extension system of the present disclosure may include a cable, a cable connector that is included on an end of the cable, and a connector fastener extension system that is integrated on the cable connector. The connector fastener extension system includes a fastener base that includes the cable connector and that is configured to rotate relative to the cable, and a fastener extension member that is moveably coupled to the fastener base and configured to move away from the cable connector and towards the cable. The rotation of the fastener extension member is configured to cause rotation of the fastener base and the cable connector relative to the cable. As also discussed below, some embodiments of the method for extending a connector fastener may replace the integrated connector fastener extension system with an attachable connector fastener extension system that connects to the cable connector included on the cabling system to provide the functionality discussed above. As such, the connector fastener extension system facilitates the unfastening of a cable connector from (or the fastening of a cable connector to) a computing device connector when, for example, the dense configuration of computing device connectors on hardware/cards in computing devices or other obstructions restrict hand/finger access to the cable connector.

Figure 9:
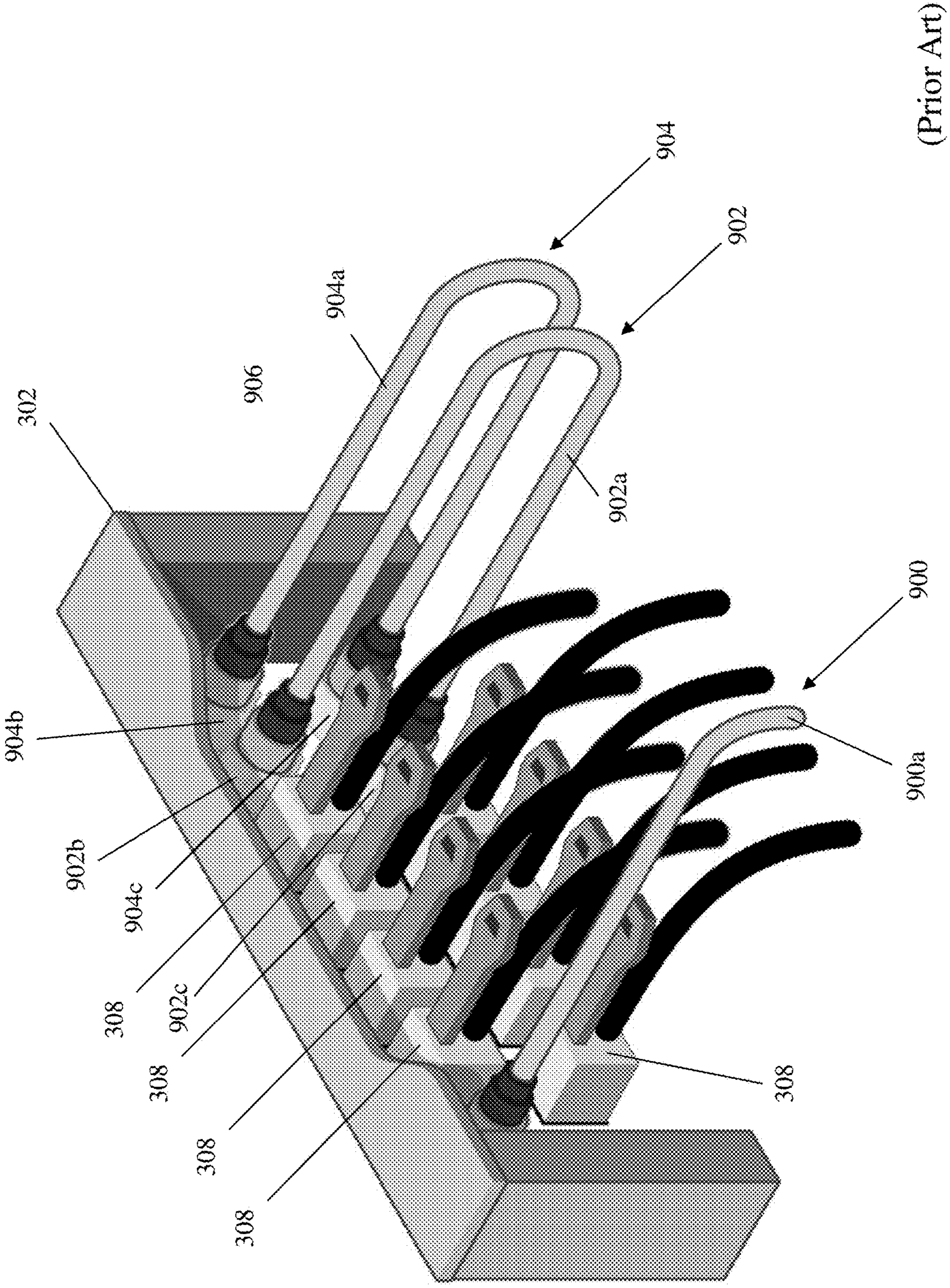
(Prior Art) FIG. 9
FIG. 9 is a perspective view illustrating an embodiment of conventional cabling systems connected to a computing device.

With reference to FIGS. 3 and 9, an embodiment of the communication system 300 of FIG. 3 is illustrated with conventional cabling systems connected to the networking device connectors 304. FIG. 9 illustrates an example, of a vertical connector stack of the networking device connectors **304*a*, 304*b*, and 304*c* and transceiver device connectors 306/transceiver devices 308 on the chassis 302 of the communication system 300, with two rows of the networking device connectors 304*a*-304*c*/transceiver device connectors 306/transceiver devices 308 vertically stacked to provide a "top" row of connectors and a "bottom" row of connectors. In the illustrated embodiment, a first conventional cabling system 900 includes a cable 900*a* and a cable connector (not visible in FIG. 9) that has been fastened to the networking device connector 304*a* in the "top" row of the vertical connector stack. Similarly, a second conventional cabling system 902 includes a cable 902*a*, a cable connector 902*b* that has been fastened to the networking device connector 304*b* in the "top" row of the vertical connector stack, and a cable connector 902*c* that has been fastened to the networking device connector 304*b*** in the "bottom" row of the vertical connector stack.

Similarly, a third conventional cabling system 904 includes a cable **904*a*, a cable connector 904*b* that has been fastened to the networking device connector 304*c* in the "top" row of the vertical connector stack, and a cable connector 904*c* that has been fastened to the networking device connector 304*c* in the "bottom" row of the vertical connector stack. As discussed above, and as will be appreciated by one of skill in the art in possession of the present disclosure, the dense configuration of cabling systems 900-904 and transceiver devices 308 on the chassis 302 in FIG. 9 may restrict hand/finger access to the cable connectors that is necessary to allow for the unfastening those cable connectors from their corresponding networking device connectors 304*a*-304*c*. However, while a specific conventional cabling system/computing device connector configuration has been illustrated and described, one of skill in the art in possession of the present disclosure will appreciate that a variety of other conventional cabling system/computing device connector configurations (e.g., the conventional cabling systems of FIG. 9 connected to the communication system 400 of FIGS. 4A and 4**B) will benefit from the connector fastener extension system of the present disclosure and thus will fall within its scope.

In the primary example of the method 800 provided below, the use of the cabling system 500 having the integrated connector fastener extension system discussed above with reference to FIGS. 5A and 5B is illustrated and described. However, as also discussed below and as will be appreciated by one of skill in the art in possession of the present disclosure, the cabling system 500 in any of the examples illustrated and described below may be replaced by the cabling system 600 discussed above with reference to FIGS. 6A-6D, or the cabling system 700 discussed above with reference to FIGS. 7A-7D. As such, one of skill in the art in possession of the present disclosure will appreciate how the attachable connector fastener extension system 706 discussed above may be attached to the cable connector 702 on the cabling system 701 prior to the beginning of the method 800 by positioning the cable connector 702 in the cable connector housing **708*a* defined by the fastener base 708 such that at least a portion of the cable connector 702 extends through the cable connector aperture 710 defined by the fastener base 708**.

Figure 10:
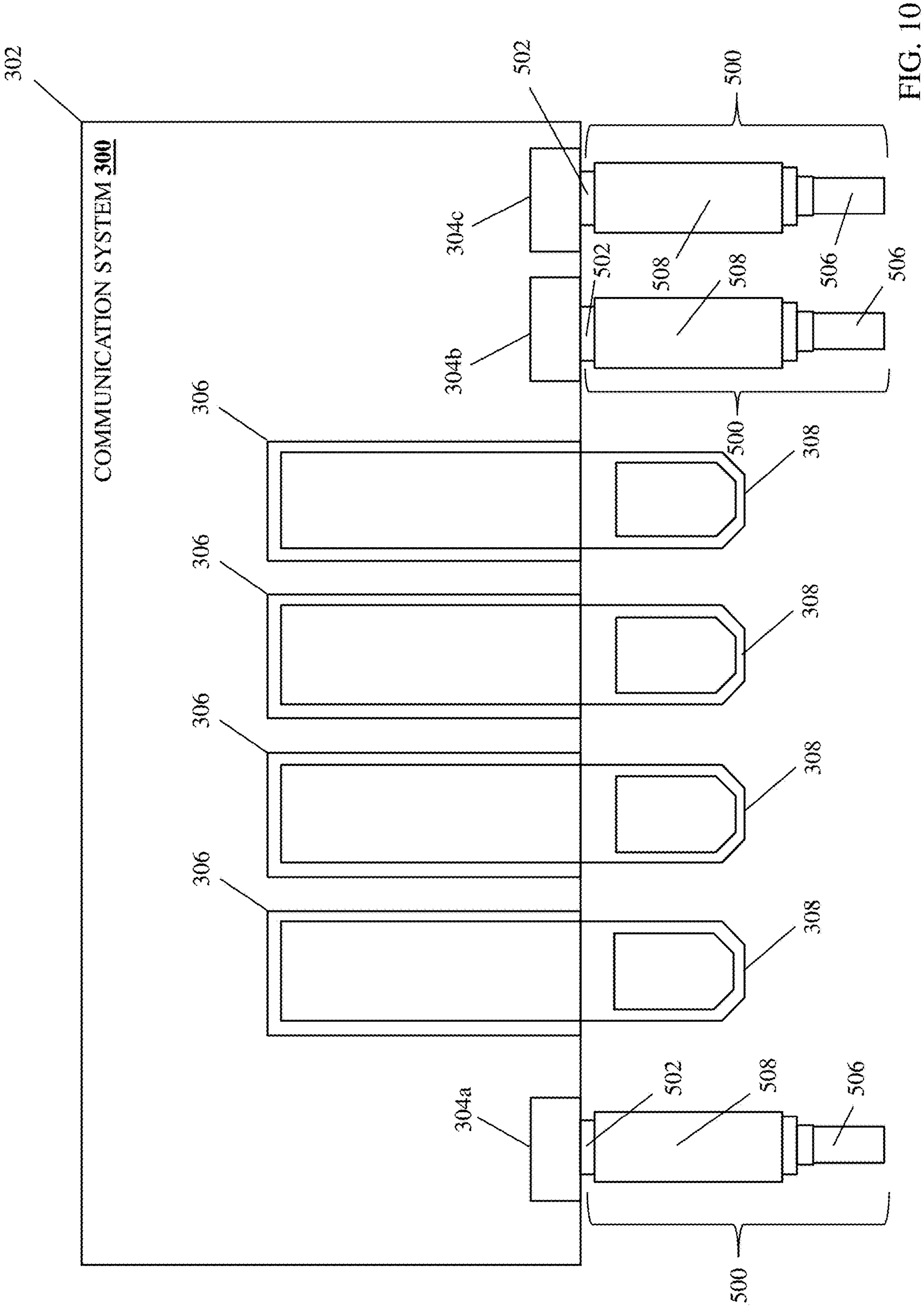
FIG. 10 is a schematic top view illustrating an embodiment of the cabling system of FIGS. 5A and 5B connected to communication system of FIG. 3 during the method of FIG. 8.

The method 800 begins at block 802 where a cable connector included on a cabling system having a connector fastener extension system is connected to a computing device connector on a computing device. With reference to FIG. 10, in an embodiment of block 802, a respective one of the cabling systems 500 discussed above with reference to FIGS. 5A and 5B may be coupled to each of the networking device connectors 304*a*, 304*b*, and 304*c* on the communication system 300. For example, the cable connector 502 on one of the cabling systems 500 may be positioned adjacent the networking device connector 304*a* and moved towards the networking device connector 304*a* until it engages the networking device connector 304*a*. The fastener extension member 508 may then be rotated relative to the networking device connector 304*a*, and as discussed above, rotation of the fastener extension member 508 will cause rotation of the fastener base 504 and the cable connector 502 to connect the cable connector 502 to the networking device connector 304*a* (e.g., via corresponding threads on the cable connector 502 and the networking device connector 304*a*.) Furthermore, while the connection of a cabling system 500 to the networking device connector 304*a* has been described, one of skill in the art in possession of the present disclosure will appreciate how the cabling systems 500 may be connected to the networking device connectors 304*b* and 304*c* in a similar manner.

Figure 11A:
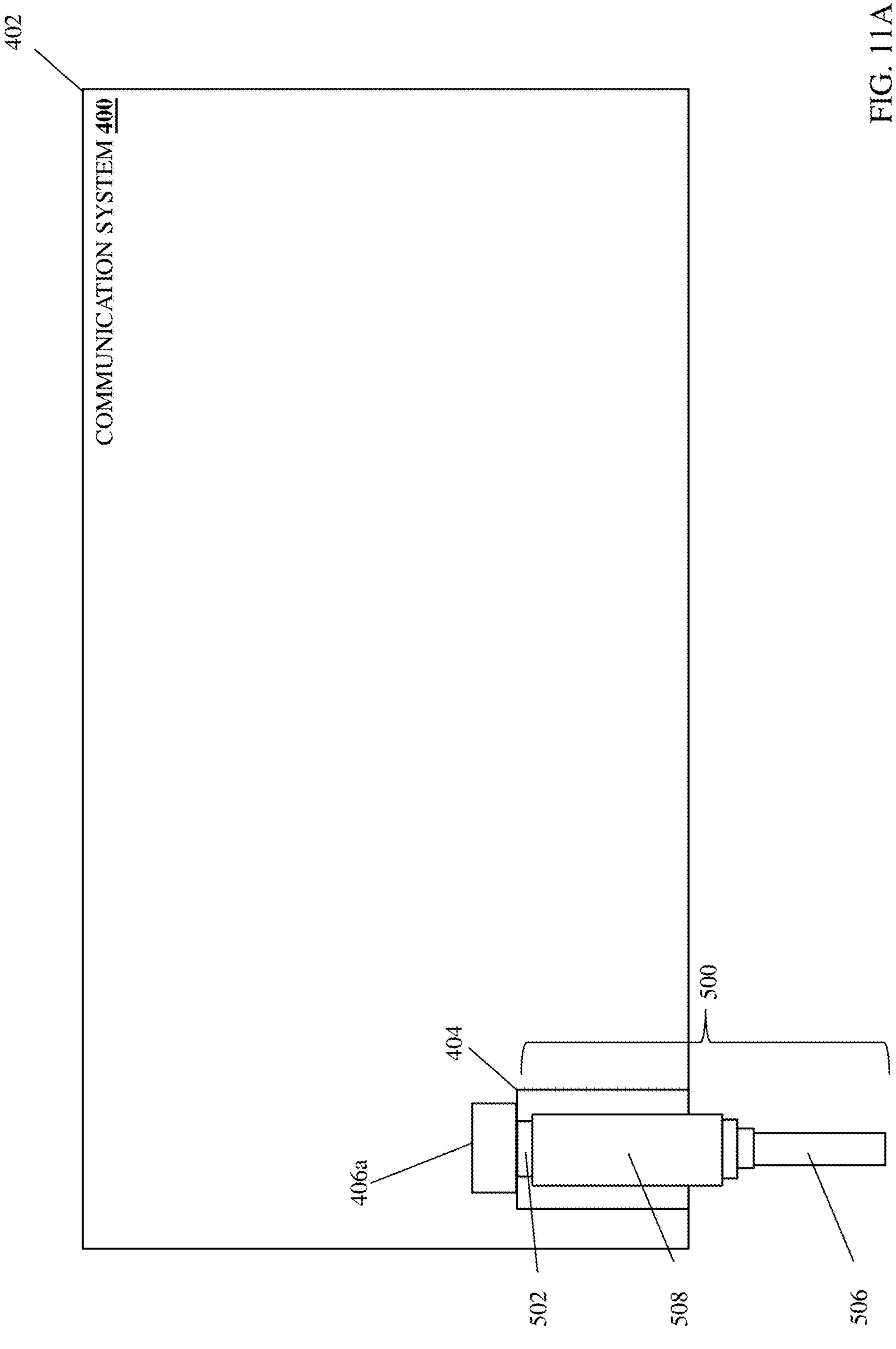
FIG. 11A is a schematic top view illustrating an embodiment of the cabling system of FIGS. 5A and 5B connected to the communication system of FIGS. 4A and 4B during the method of FIG. 8.
Figure 11B:
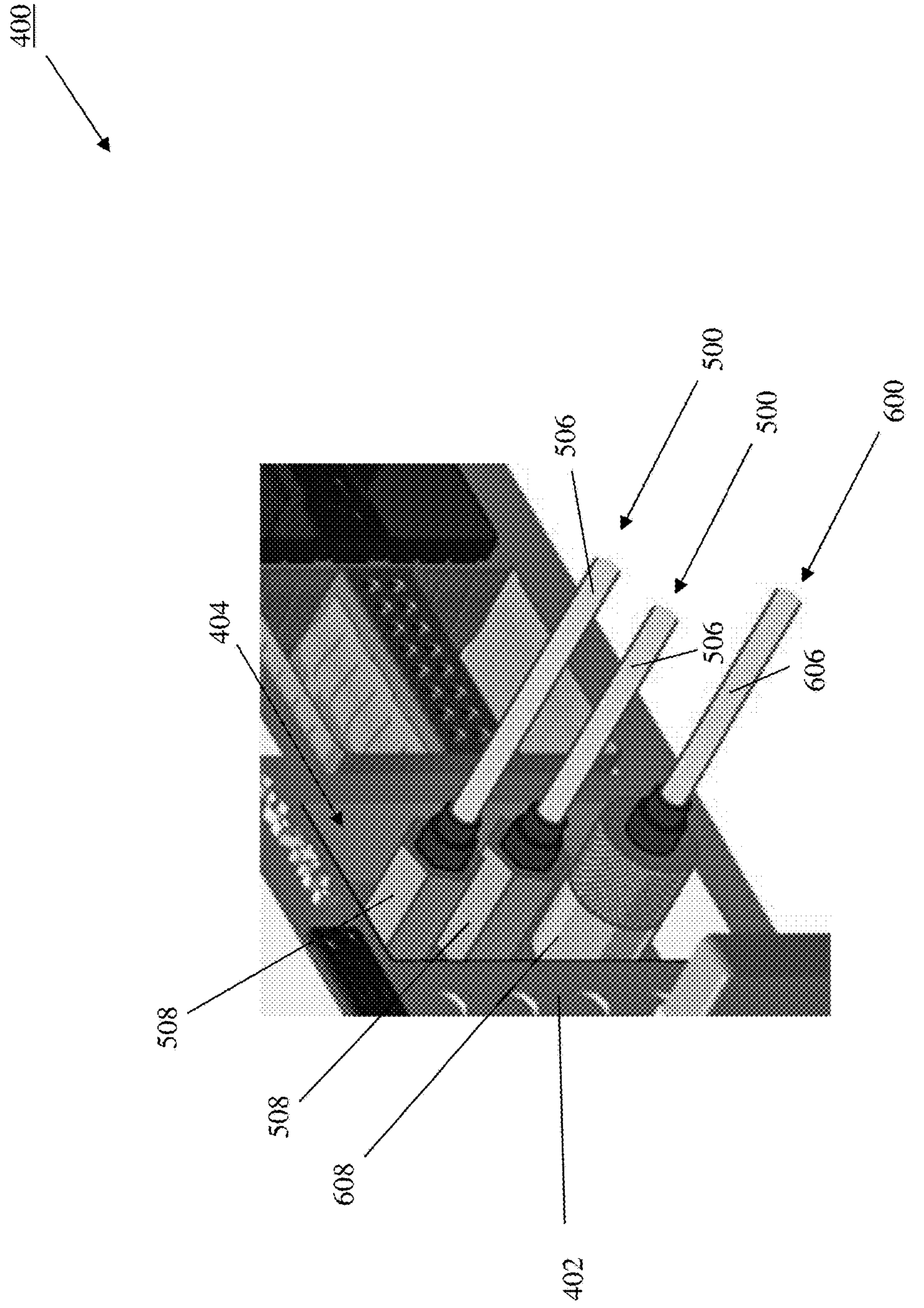
FIG. 11B is a perspective view illustrating an embodiment of the cabling systems of FIGS. 5A, 5B, 6A and 6B connected to the communication system of FIGS. 4A and 4B during the method of FIG. 8.

With reference to FIGS. 11A and 11B, in an embodiment of block 802, a respective one of the cabling systems 500 discussed above with reference to FIGS. 5A and 5B may be coupled to the networking device connectors 406*a* and 406*b* on the communication system 400, and the cabling system 600 discussed above with reference to FIGS. 6A-6D may be coupled to the networking device connector 406*c* on the communication system 400. For example, the cable connector 502 on one of the cabling systems 500 may be positioned adjacent the networking device connector 406*a* and moved towards the networking device connector 406*a* until it engages the networking device connector 406*a*. The fastener extension member 508 may then be rotated relative to the networking device connector 406*a*, and as discussed above, rotation of the fastener extension member 508 will cause rotation of the fastener base 504 and the cable connector 502 to connect the cable connector 502 to the networking device connector 406*a* (e.g., via corresponding threads on the cable connector 502 and the networking device connector 406*a*.). Furthermore, while the connection of a cabling system 500 to the networking device connector 304*a* has been described, one of skill in the art in possession of the present disclosure will appreciate how the cabling systems 500 and 600 may be connected to the networking device connectors 406*b* and 406*c*, respectively, in a similar manner.

In some situations (e.g., when the cabling system(s) 500/600 are among the first to be connected to the communication system 300/400 and adequate hand/finger space is available to fasten those cabling system 500/600 to the networking device connectors), the utilization of the connector fastener extension system of the present disclosure via the extension of the fastener extension member 508/608 from the fastener base 504/604 as discussed herein may not be necessary to facilitate the fastening of the cabling system 500/600 to that networking device connector. However, as will be appreciated by one of skill in the art in possession of the present disclosure and as discussed below, the connector fastener extension system of the present disclosure may be utilized to fasten the cable connector on any of the cabling systems 500, 600, or 700 to the networking device connectors while remaining within the scope of the present disclosure as well.

Figure 12A:
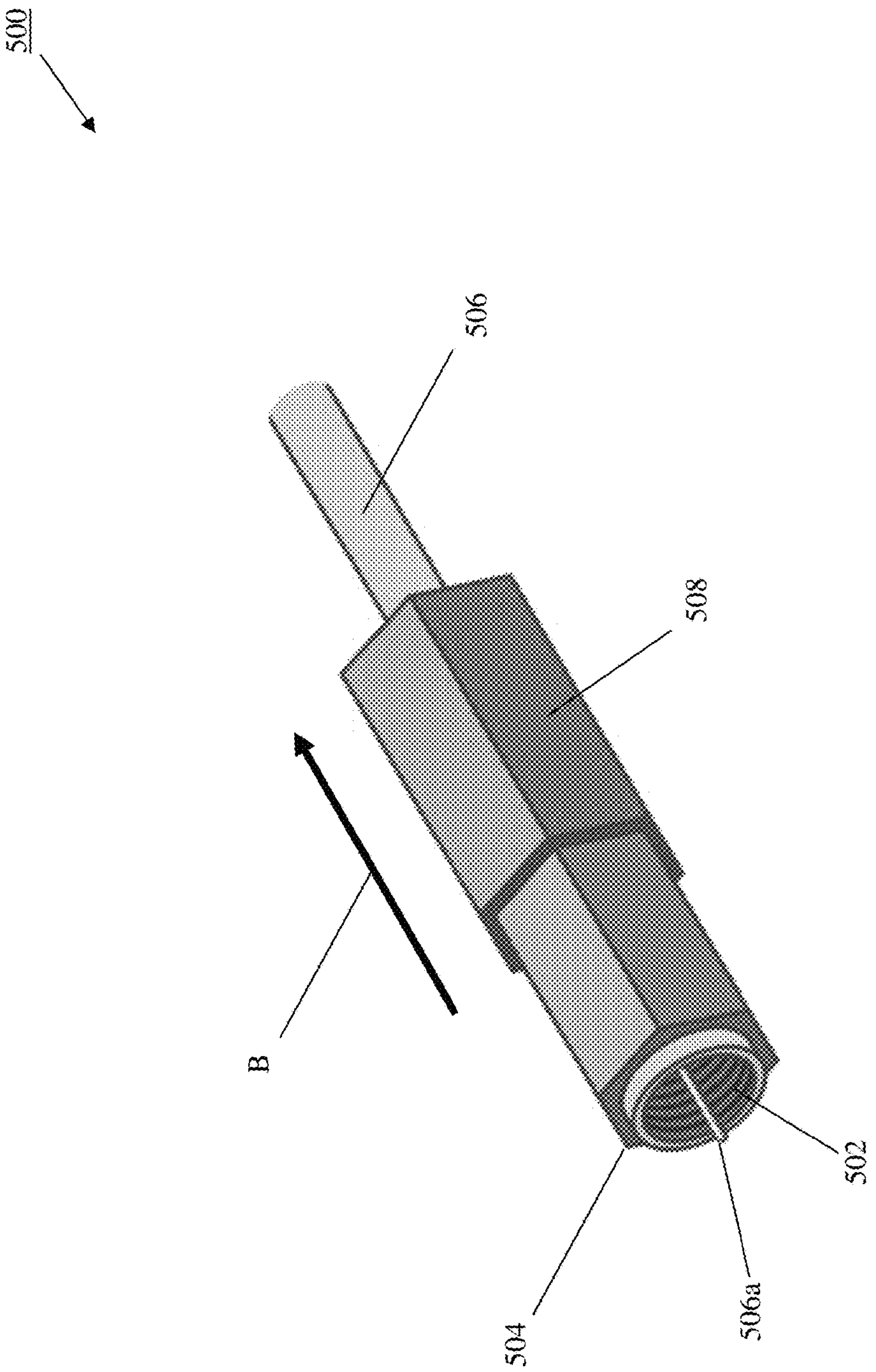
FIG. 12A is a perspective view illustrating an embodiment of the operation of the connector fastener extension system on the cabling system of FIGS. 5A and 5B during the method of FIG. 8.
Figure 12B:
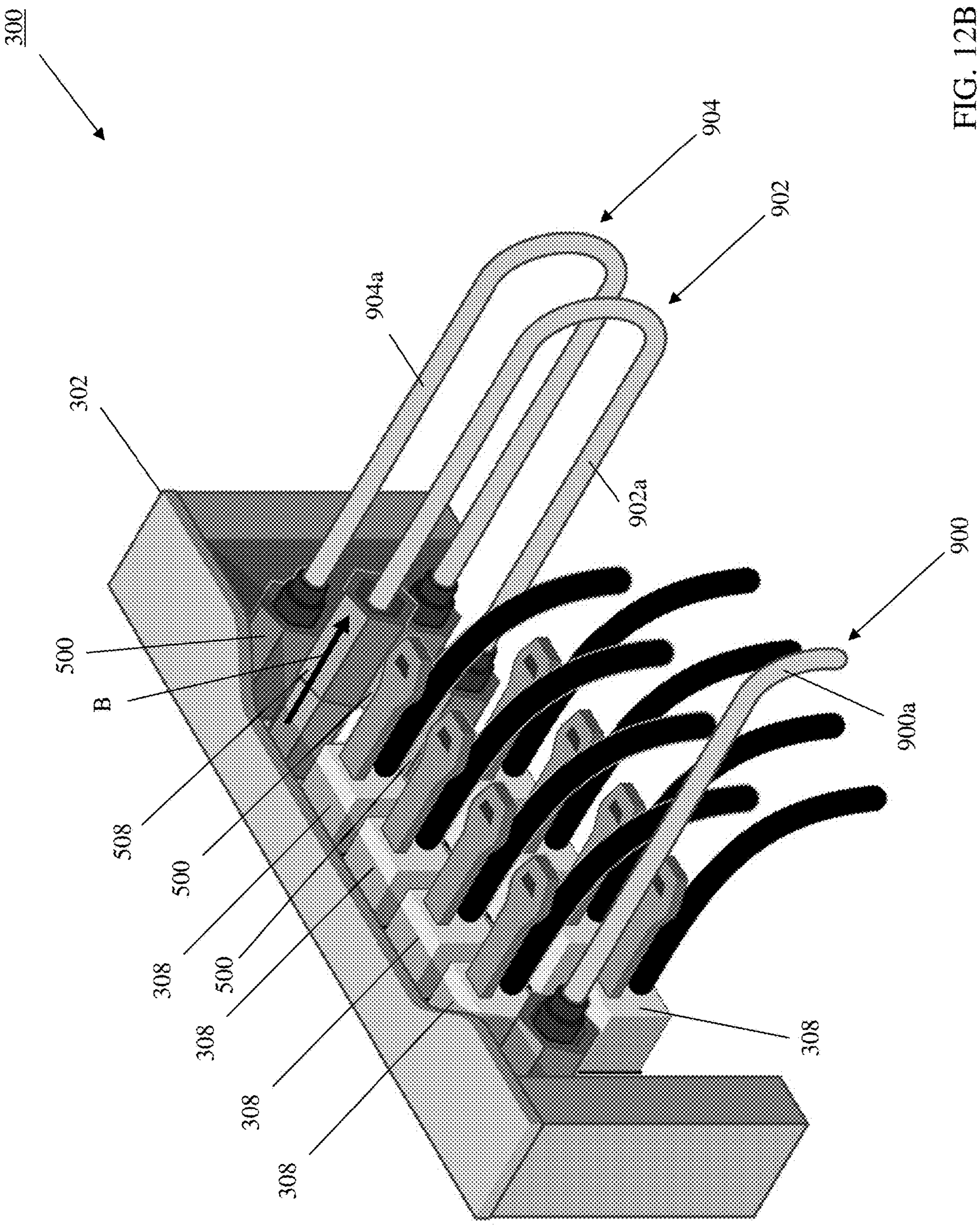
FIG. 12B is a perspective view illustrating an embodiment of the operation of the connector fastener extension system on the cabling system connected to the communication system in FIG. 10 during the method of FIG. 8.

The method 800 then proceeds to block 804 where a fastener extension member moveably coupled to the fastener base on the connector fastener extension system is moved away from the cable connector and towards the cable. With reference to FIG. 12A, in an embodiment of block 804, the fastener extension member 508 may be moved relative to the fastener base 504 in a telescoping motion and in a direction B away from the cable connector 502 and towards the cable 506. As can be seen in FIG. 12B, in situations where a dense configuration of cabling systems 900-904 and transceiver devices 308 are provided on the communication system 300/chassis 302, the movement of the fastener extension member 508 away from the cable connector 502 (not visible in FIG. 12B) in the direction B will operate to provide hand/finger access to the fastener extension member 508 that facilitates the disconnection of the cable connector 502 from the networking device connector 304*b* in the "top" row of the vertical connector stack (not visible in FIG. 12B) on the communication system 300.

Figure 12C:
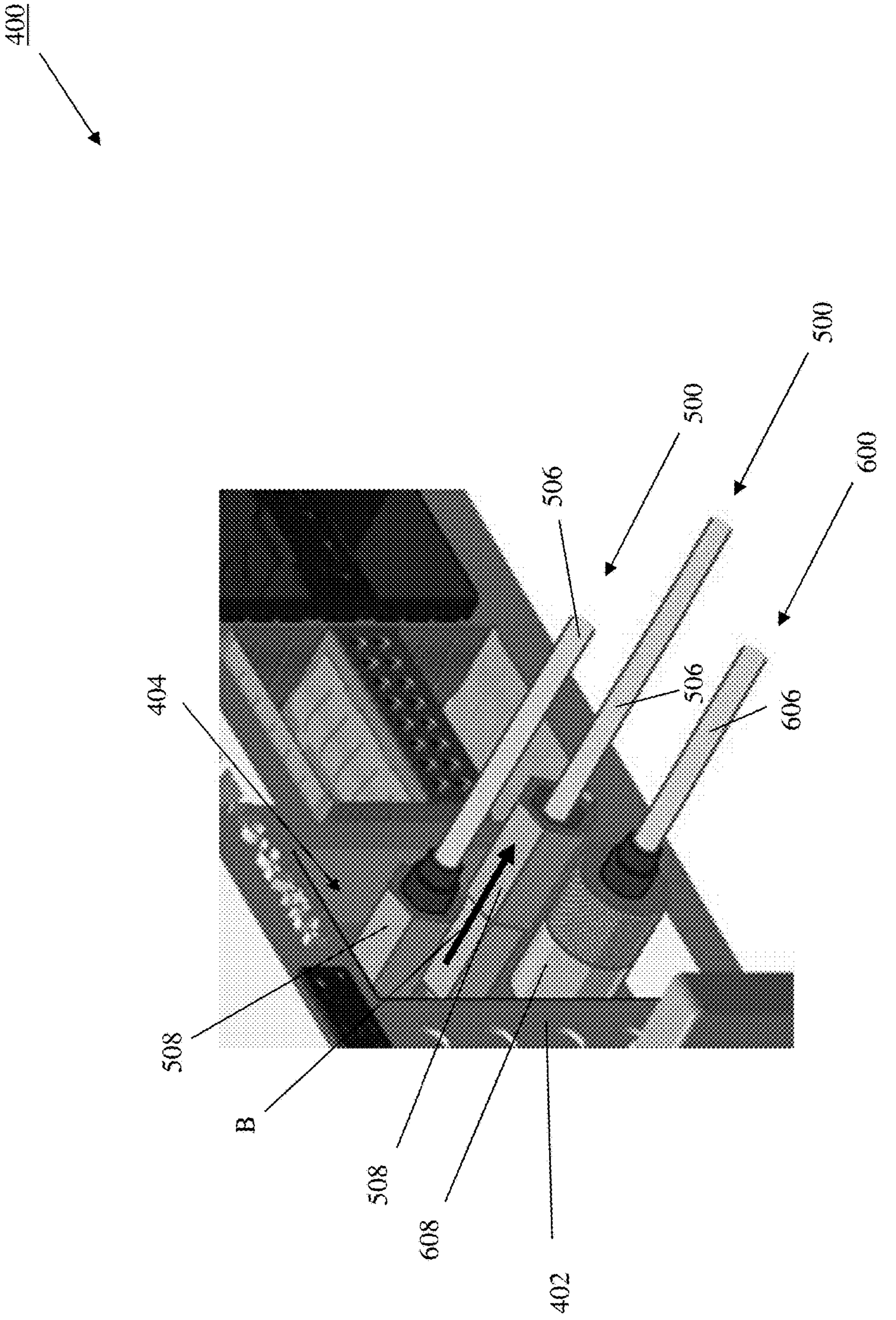
FIG. 12C is a perspective view illustrating an embodiment of the operation of the connector fastener extension system on the cabling system connected to the communication system in FIGS. 11A and 11B during the method of FIG. 8.

Similarly, with reference to FIG. 12C, in situations where a plurality of the cabling systems 500 and 600 are connected to networking device connectors 406*a*-406*c* in the recessed section 404 defined on the chassis 402, the movement of the fastener extension member 508 away from the cable connector 502 (not visible in FIG. 12C) in the direction B will operate to provide hand/finger access to the fastener extension member 508 that facilitates the disconnection of the cable connector 502 from the networking device connector 406*b* (not visible in FIG. 12C) in the "middle" row of the vertical connector stack on the communication system 400. As discussed above, while examples of the operation of the connector fastener extension system of the present disclosure are illustrated and described using the cabling system 500 and the communication systems 300 and 400, one of skill in the art in possession of the present disclosure will appreciate how the connector fastener extension system/cabling system 600 and/or the connector fastener extension system 706/cabling system 700 may be connected to communication systems and operated similarly as described above for the cabling system 500.

As discussed above, in some embodiments, as the fastener extension member 508 is moved relative to the fastener base 504, locking elements or locking features on the fastener base 504 and the fastener extension member 508 (not visible in FIG. 12A, 12B, or 12C) may engage to lock or otherwise prevent relative movement of the fastener extension member 508 and the fastener base 504 from the orientation illustrated in FIGS. 12A, 12B, and 12C. Also as discussed above, the locking features included on the fastener base 504 and the fastener extension member 508 may include a release member (not visible in FIGS. 12A, 12B, and 12C) that is configured to disengage the locking features and unlock or otherwise allow relative movement of the fastener extension member 508 and the fastener base 504 between the extended orientation illustrated in FIGS. 12A. 12B, and 12C and the orientation illustrated in FIG. 5A.

Figure 13:
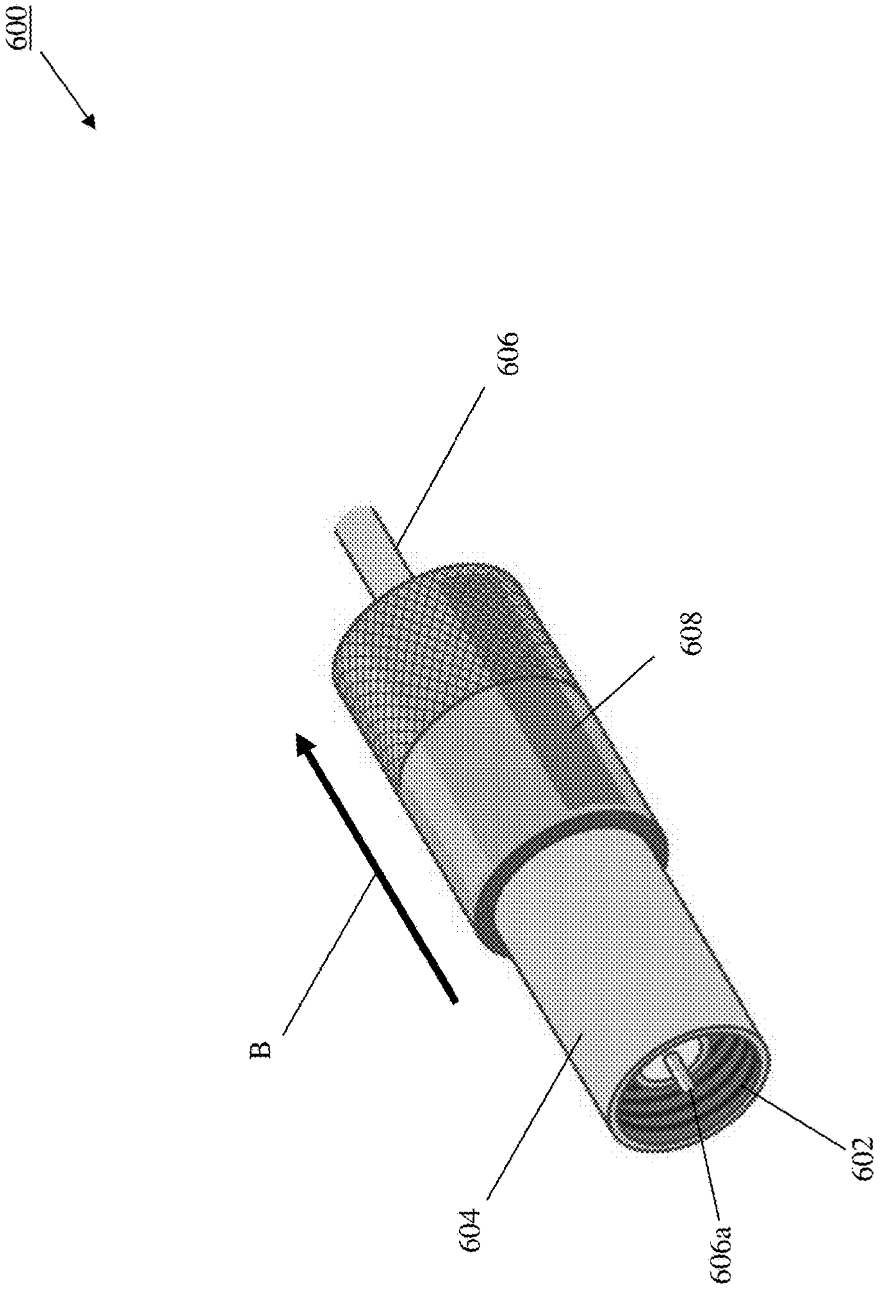
FIG. 13 is a perspective view illustrating an embodiment of the operation of the connector fastener extension system on the cabling system of FIGS. 6A, 6B, 6C, and 6D during the method of FIG. 8.

Similarly as discussed above, with reference to FIG. 13, at block 804 the fastener extension member 608 included on the cabling system 600 may be moved relative to the fastener base 604 in a telescoping motion and in a direction B away from the cable connector 602 and towards the cable 606. As discussed above, such relative movement of the fastener extension member 608 and the fastener base 604 may cause their corresponding interlock sections 608*c* and 604*c* to interlock in order to prevent relative rotational movement of the fastener base 604 and the fastener extension member 608, while locking features on the fastener extension member 608 and the fastener base 604 may engage to prevent movement of the fastener extension member 608 relative to the fastener base 604 from the orientation illustrated in FIG. 13. As such, in situations in which the cabling system 600 is connected to a communication system that has been provided with a dense configuration of cabling systems and transceiver devices, in a recessed portion of a chassis, and/or in other access-obstructed situations that would be apparent to one of skill in the art in possession of the present disclosure, the fastener extension member 608 may be moved into the orientation illustrated in FIG. 13 to provide hand/finger access to the fastener extension member 608 that facilitates the disconnecting of the cable connector 602 from its connected networking device connector.

Figure 14:
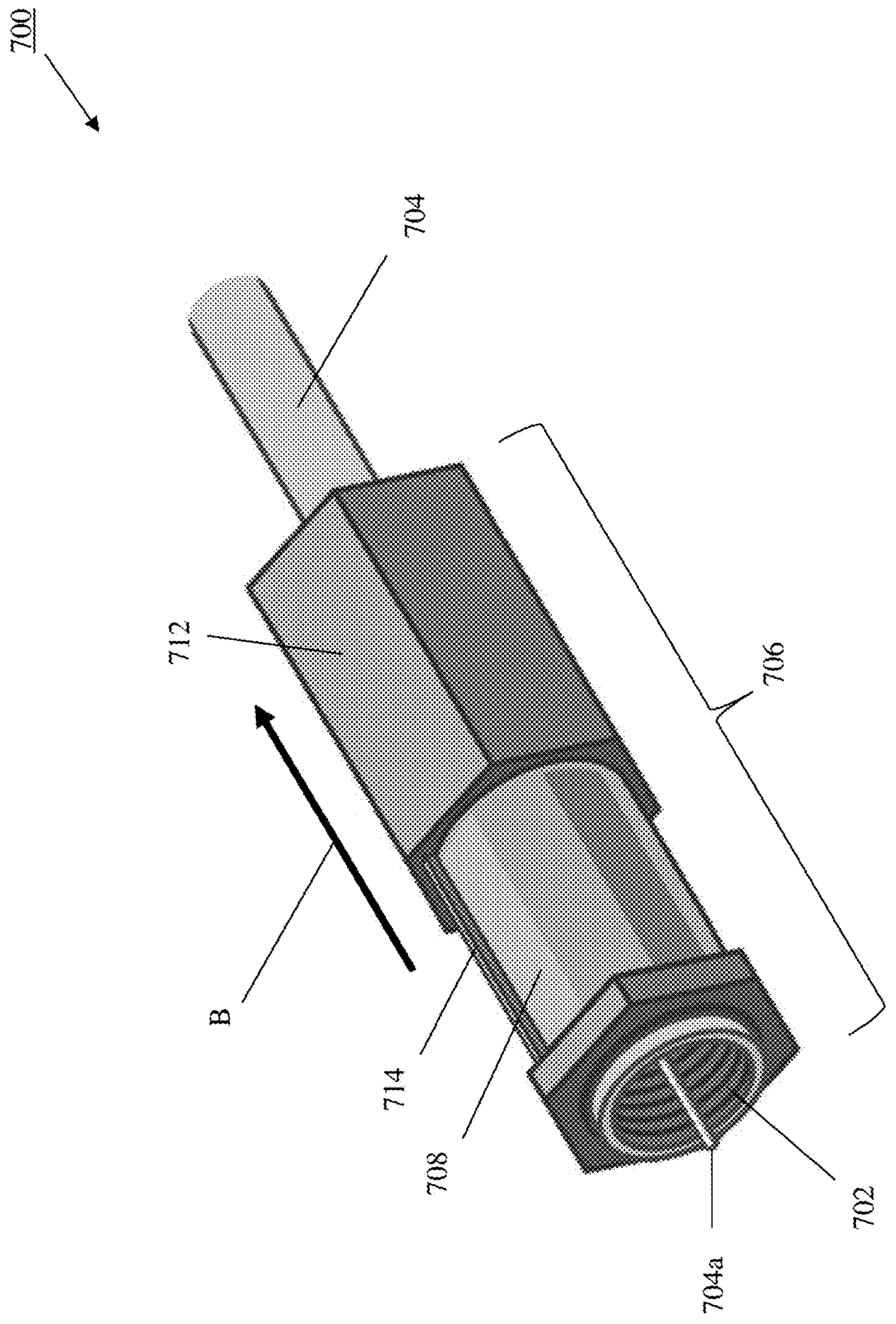
FIG. 14 is a perspective view illustrating an embodiment of the operation of the connector fastener extension system on the cabling system of FIGS. 7A, 7B, and 7C during the method of FIG. 8.

Similarly as well, with reference to FIG. 14, at block 804 the fastener extension member 712 that is attached to the cable connector 702 included on the cabling system 700 may be moved relative to the fastener base 708 in a telescoping motion and in a direction B away from the cable connector 702 and towards the cable 704. As discussed above, such relative movement of the fastener extension member 712 and the fastener base 708 may cause locking features on the fastener extension member 712 and the fastener base 708 to engage to prevent movement of the fastener extension member 712 relative to the fastener base 708 from the orientation illustrated in FIG. 14. As such, in situations in which the cabling system 700 is connected to a communication system that has been provided with a dense configuration of cabling systems and transceiver devices, in a recessed portion of a chassis, and/or in other access-obstructed situations that would be apparent to one of skill in the art in possession of the present disclosure the fastener extension member 712 may be moved into the orientation illustrated in FIG. 14 to provide hand/finger access to the fastener extension member 712 that facilitates the disconnecting of the cable connector 702 from its connected networking device connector.

Figure 15A:
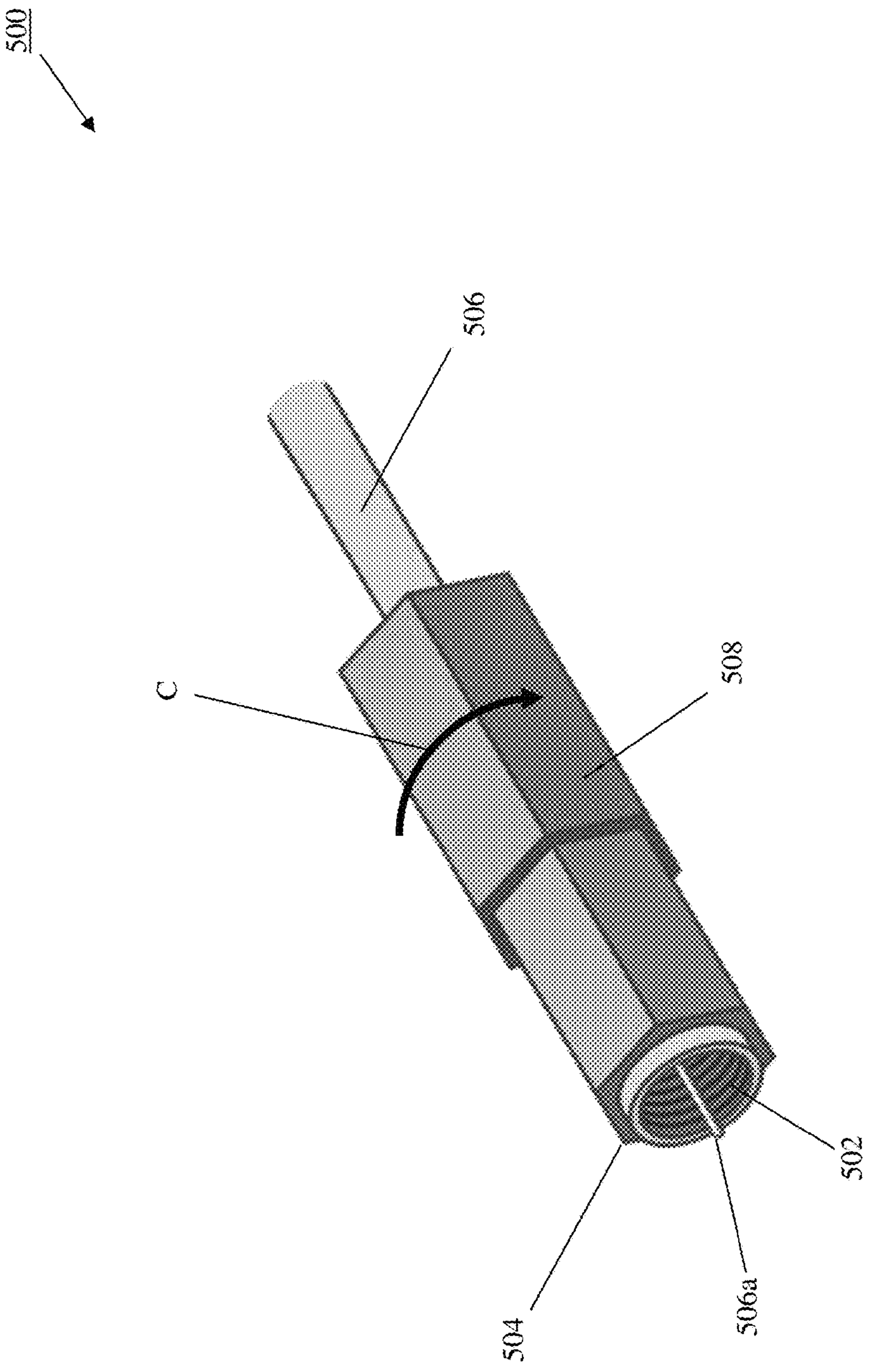
FIG. 15A is a perspective view illustrating an embodiment of the operation of the connector fastener extension system on the cabling system of FIGS. 5A and 5B during the method of FIG. 8.

The method 800 then proceeds to block 806 where the fastener extension member is rotated to cause the rotation of the fastener base and the cable connector relative to the computing device connector to disconnect the cable connector from the computing device connector. With reference to FIG. 15A, in an embodiment of block 806, the fastener extension member 508 may be rotated in a direction C to cause the rotation of the fastener base 504 and the cable connector 502 relative to the cable 506 to disconnect the cable connector 502 from its connected networking device connector.

Figure 15B:
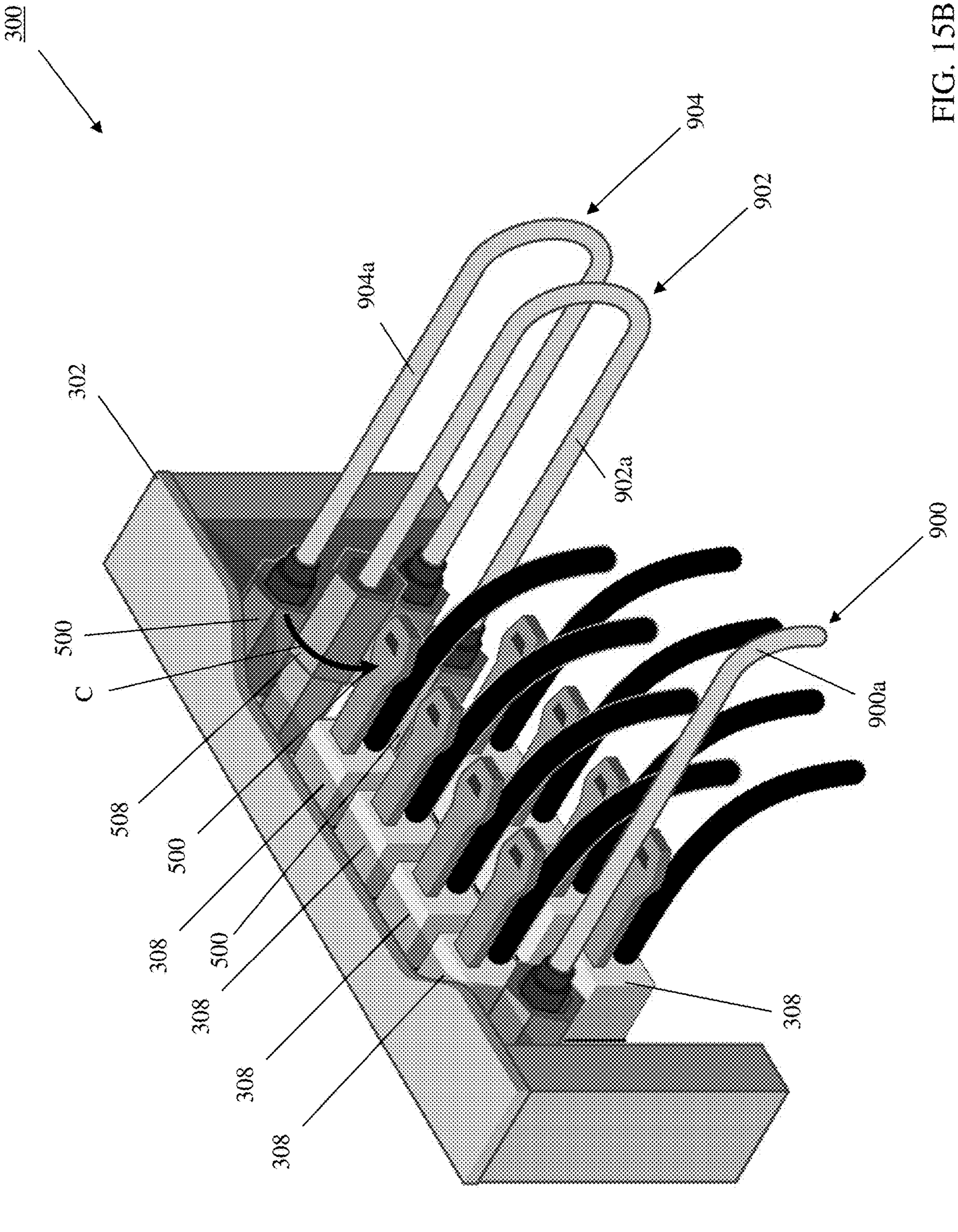
FIG. 15B is a perspective view illustrating an embodiment of the operation of the connector fastener extension system on the cabling system connected to communication system in FIG. 10 during the method of FIG. 8.

As can be seen in FIG. 15B and as will be appreciated by one of skill in the art in possession of the present disclosure, in situations where the dense configuration of cabling systems 900-904 and transceiver devices 308 are provided on the communication system 300/chassis 302 and hand/finger access is restricted, the rotation of the fastener extension member 508 in the direction C when the fastener extension member 508 has been extended from the fastener base 504 (and the cable connector 502, not visible in FIG. 15B) causes the rotation of the cable connector 502 that allows for the disconnection of the cable connector 502 from the networking device connector 304*b* in the "top" row of the vertical connector stack on the communication system 300. As discussed above, where the fastener extension member 508 and the fastener base 504 include locking features to prevent movement of the fastener extension member 508 relative to the fastener base 504 when the fastener extension member 508 has been extended, following the rotation of the fastener extension member 508 and the disconnection of the cable connector 502 from the networking device connector 304*b*, the release member accessible on either of the fastener base 504 and/or the fastener extension member 508 may be utilized to disengage the locking elements on the fastener base 504 and the fastener extension member 508 to allow the fastener extension member 508 to move back towards the cable connector 502 and into the orientation illustrated in FIG. 5A.

Figure 15C:
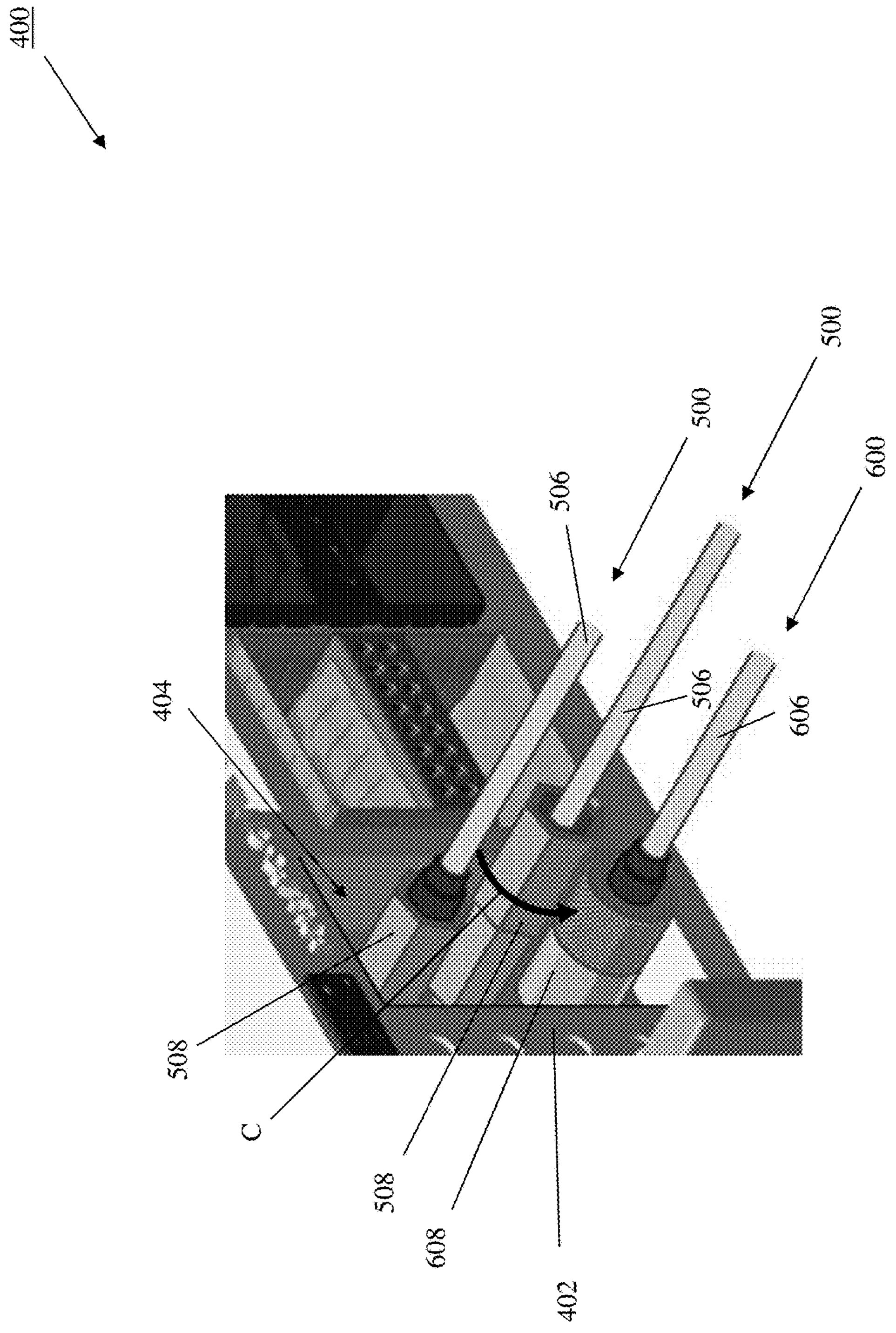
FIG. 15C is a perspective view illustrating an embodiment of the operation of the connector fastener extension system on the cabling system connected to communication system in FIGS. 11A and 11B during the method of FIG. 8.

Similarly, with reference to FIG. 15C and as will be appreciated by one of skill in the art in possession of the present disclosure, in situations where a plurality of the cabling systems 500 and 600 are connected to networking device connectors 406*a*-406*c* (not visible in FIG. 15C) in the recessed section 404 defined on the device chassis 402 and hand/finger access is restricted, the movement of the fastener extension member 508 relative to the fastener base 504 (and away from the cable connector 502, not visible in FIG. 15C) facilitates the rotation of the cable connector 502 that allows for the disconnection of the cable connector 502 from the networking device connector 406*b* in the "middle" row of the vertical connector stack on the communication system 400. Similarly as discussed above, where the fastener extension member 508 and the fastener base 504 include locking features to prevent movement of the fastener extension member 508 relative to the fastener base 504 when the fastener extension member 508 has been extended, following the rotation of the fastener extension member 508 and the disconnection of the cable connector 502 from the networking device connector 406*b*, the release member accessible on either of the fastener base 504 and/or the fastener extension member 508 may be utilized to disengage the locking elements on the fastener base 504 and the fastener extension member 508 to allow the fastener extension member 508 to move back towards the cable connector 502 and into the orientation illustrated in FIG. 5A.

Figure 16:
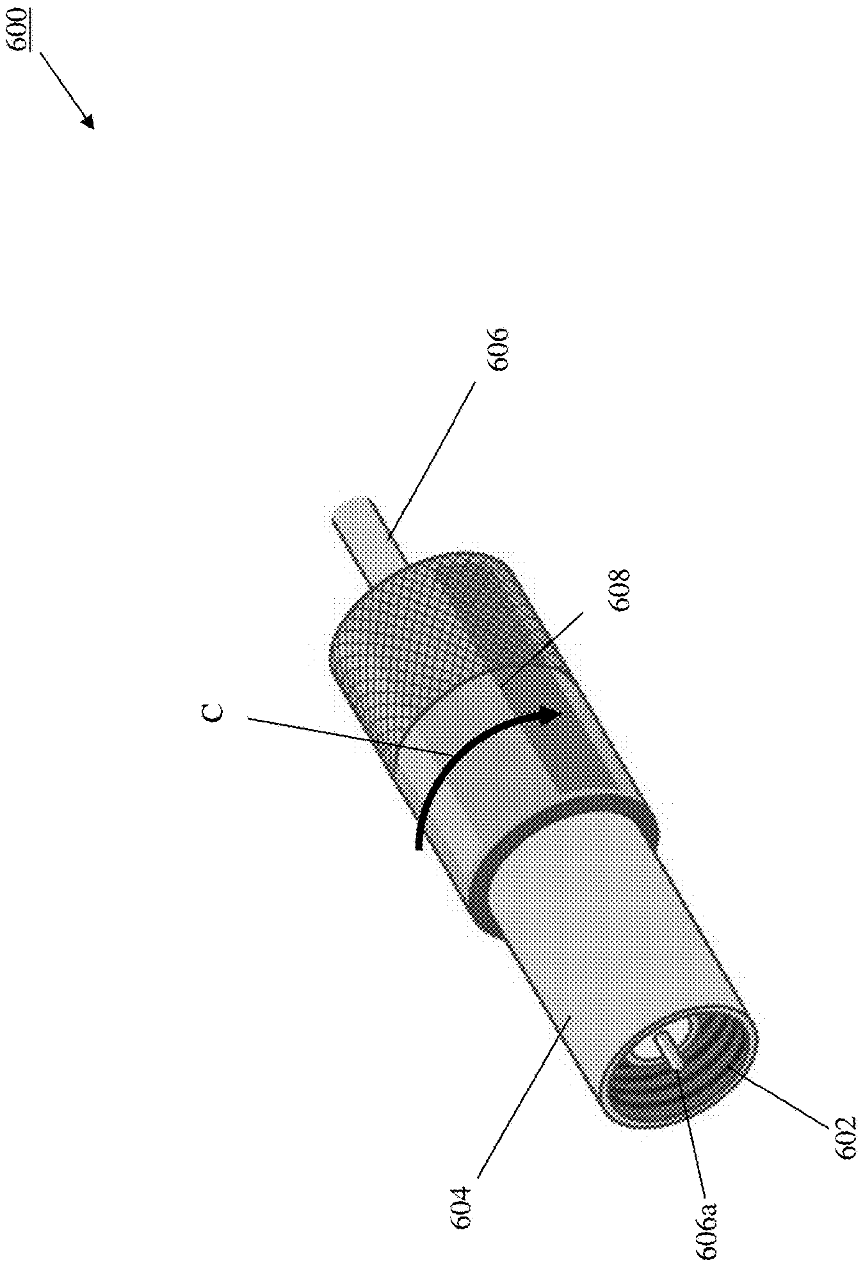
FIG. 16 is a perspective view illustrating an embodiment of the operation of the connector fastener extension system on the cabling system of FIGS. 6A, 6B, 6C, and 6D during the method of FIG. 8.

Similarly as described above, with reference to FIG. 16 and in an embodiment of block 806, the fastener extension member 608 may be rotated in the direction C to cause the rotation of the fastener base 604 and the cable connector 602 (e.g., due to the interlocking of the interlock sections 608*c* and 604*c* that prevents relative rotational movement of the fastener base 604 and the fastener extension member 608, as discussed above) relative to the cable 606 to facilitate the disconnection of the cable connector 602 from its connected networking device connector, and one of skill in the art in possession of the present disclosure will appreciate how the rotation of the fastener extension member 608 in the direction C when the fastener extension member 608 has been extended from the fastener base 604 causes the rotation of the cable connector 602 that allows for the disconnection of the cable connector 502 from its connected networking device connector. Furthermore, in some embodiment and following the rotation of the fastener extension member 608 and the disconnection of the cable connector 602 from its connected networking device connector, a release member accessible on either of the fastener base 604 and/or the fastener extension member 608 may be utilized to disengage locking elements on the fastener base 604 and the fastener extension member 608 to allow the fastener extension member 608 to move back towards the cable connector 602 and into the orientation illustrated in FIG. 6A.

Figure 17:
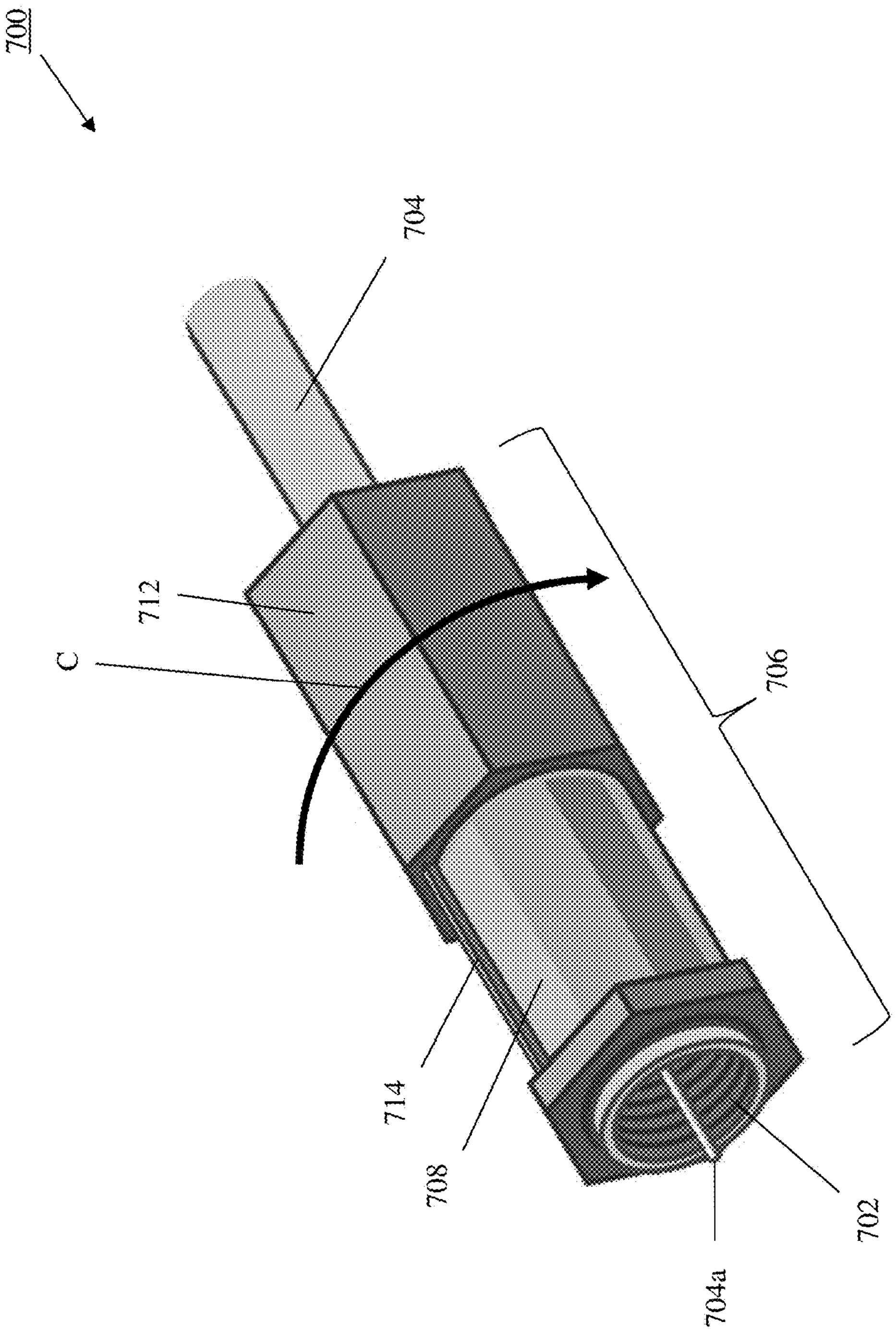
FIG. 17 is a perspective view illustrating an embodiment of the operation of the connector fastener extension system on the cabling system of FIGS. 7A, 7B, and 7C during the method of FIG. 8.

Similarly as described above as well, with reference to FIG. 17 and in an embodiment of block 806, the fastener extension member 712 may be rotated in the direction C to cause the rotation of the fastener base 708 and the cable connector 702 relative to the cable 704 to facilitate the disconnection of the cable connector 702 from its connected networking device connector, and one of skill in the art in possession of the present disclosure will appreciate how the rotation of the fastener extension member 712 in the direction C when the fastener extension member 712 has been extended from the fastener base 708 causes the rotation of the cable connector 702 that allows for the disconnection of the cable connector 702 from its connected networking device connector. Furthermore, in some embodiment and following the rotation of the fastener extension member 712 and the disconnection of the cable connector 702 from its connected networking device connector, a release member accessible on either of the fastener base 708 and/or the fastener extension member 712 may be utilized to disengage locking elements on the fastener base 708 and the fastener extension member 712 to allow the fastener extension member 712 to move back towards the cable connector 702 and into the orientation illustrated in FIG. 7B.

As will be appreciated by one of skill in the art in possession of the present disclosure and as discussed above, while the specific examples discussed above primarily illustrate and describe the relative movement of the fastener extension member and the fastener base in the connector fastener extension system of the present disclosure when disconnecting cable connectors from networking device connectors, the relative movement of the fastener extension member and the fastener base in the connector fastener extension system of the present disclosure may be beneficial when connecting cable connectors to networking device connectors as well. As such, the fastener extension member may be moved relative to the fastener base (and in some embodiments, locked) into the "extended" orientation (e.g., as illustrated in FIGS. 5B, 6B, and 7C) in order to facilitate the connection of the cable connector to a networking device connector via the rotation of the fastener extension member that rotates the cable connector and connects it to the networking device connector. Furthermore, following such a connection and in embodiments in which the fastener extension member has been locked relative to the fastener base into the "extended" orientation, a release member may be used to unlock the fastener extension member and the fastener base to allow the fastener extension member to be moved back into (and in some cases locked in) a "retracted" orientation (e.g., as illustrated in FIGS. 5A, 6A, and 7B).

Thus, systems and methods have been described that provide for the extension of a connector fastener to facilitate the fastening or unfastening of a cable connector from a computing device connector. For example, the connector fastener extension system of the present disclosure may include a cable, a cable connector that is included on an end of the cable, and a connector fastener extension system that is integrated on the cable connector. The connector fastener extension system includes a fastener base that includes the cable connector and that is configured to rotate relative to the cable, and a fastener extension member that is moveably coupled to the fastener base and configured to move away from the cable connector and towards the cable. The rotation of the fastener extension member is configured to cause rotation of the fastener base and the cable connector relative to the cable. As also discussed above, some embodiments of the method for extending a connector fastener may replace the integrated connector fastener extension system with an attachable connector fastener extension system that connects to the cable connector included on the cabling system to provide the functionality discussed above. As such, the connector fastener extension system facilitates a user to unfasten a cable connector from (or fasten the cable connector to) a computing device connector when, for example, the dense configuration of computing device connectors on hardware/cards in computing devices or other obstructions restrict hand/finger access to the cable connector.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A connector fastener extension system, comprising:

a fastener base that defines a cable connector housing and a cable connector aperture adjacent the cable connector housing, wherein the fastener base is configured to connect to a cable connector that is located on an end of a cable by positioning the cable connector in the cable connector housing such that at least a portion of the cable connector extends through the cable connector aperture; and a fastener extension member that is moveably coupled to the fastener base and configured to move away from the fastener base and towards the cable when the cable connector is connected to the fastener base, wherein rotation of the fastener extension member is configured to cause rotation of the fastener base and the cable connector relative to the cable when the cable connector is connected to the fastener base.

2. The system of claim 1, wherein the fastener base is configured to connect to a SubMiniature version A (SMA) cable connector.

3. The system of claim 1, wherein the fastener extension member includes a telescoping moveable coupling to the fastener base.

4. The system of claim 3, wherein each of the fastener base and the fastener extension member includes a polygonal perimeter.

5. The system of claim 3, wherein each of the fastener base and the fastener extension member includes a circular perimeter.

6. The system of claim 5, wherein the fastener base and the fastener extension member are configured to interlock when the fastener extension member moves away from the fastener base, and wherein the interlocking enables the rotation of the fastener base and the cable connector relative to the cable when the cable connector is connected to the fastener base in response to the rotation of the fastener extension member.

7. A cabling system, comprising:

a cable;

a cable connector that is included on an end of the cable and that is configured to rotate relative to the cable; and an attachable connector fastener extension system that includes:

a fastener base that defines a cable connector housing and a cable connector aperture adjacent the cable connector housing, wherein the fastener base is configured to connect to the cable connector by positioning the cable connector in the cable connector housing such that at least a portion of the cable connector extends through the cable connector aperture; and a fastener extension member that is moveably coupled to the fastener base and configured to move away from the fastener base and towards the cable when the cable connector is connected to the fastener base, wherein rotation of the fastener extension member is configured to cause rotation of the fastener base and the cable connector relative to the cable when the cable connector is connected to the fastener base.

8. The cabling system of claim 7, wherein the cable connector is a SubMiniature version A (SMA) cable connector.

9. The cabling system of claim 7, wherein the fastener extension member includes a telescoping moveable coupling to the fastener base.

10. The cabling system of claim 9, wherein each of the fastener base and the fastener extension member includes a polygonal perimeter.

11. The cabling system of claim 9, wherein each of the fastener base and the fastener extension member includes a circular perimeter.

12. The cabling system of claim 11, wherein the fastener base and the fastener extension member are configured to interlock when the fastener extension member moves away from the cable connector and towards the cable, and wherein the interlocking enables the rotation of the fastener base and the cable connector relative to the cable in response to the rotation of the fastener extension member.

13. The cabling system of claim 7, wherein the cable connector is configured to connect to a computing device connector that is located in a recessed section defined by a computing device chassis, and the movement of the connector fastener extension member away from the cable connector and towards the cable is configured to extend the connector fastener extension member past an entrance to the recessed section of the computing device chassis.

14. A method for extending a connector fastener, comprising:

connecting, by a fastener base that defines a cable connector housing and a cable connector aperture adjacent the cable connector housing, to a cable connector that is located on the end of a cable by positioning the cable connector in the cable connector housing such that at least a portion of the cable connector extends through the cable connector aperture;

connecting, by the cable connector that is connected to the fastener base, to a computing device connector on a computer device;

moving, by a fastener extension member that is moveably coupled to the fastener base, away from the cable connector and towards the cable; and rotating, by the fastener extension member, to cause rotation of the fastener base and the cable connector relative to the cable to disconnect the cable connector from the computing device connector.

15. The method of claim 14, wherein the cable connector is a SubMiniature version A (SMA) cable connector.

16. The method of claim 14, wherein the fastener extension member includes a telescoping moveable coupling to the fastener base.

17. The method of claim 16, wherein each of the fastener base and the fastener extension member includes a polygonal perimeter.

18. The method of claim 16, wherein each of the fastener base and the fastener extension member includes a circular perimeter.

19. The method of claim 18, wherein the fastener base and the fastener extension member are configured to interlock when the fastener extension member moves away from the cable connector and towards the cable, and wherein the interlocking enables the rotation of the fastener base and the cable connector relative to the cable in response to the rotation of the fastener extension member.

20. The method of claim 14, wherein the computing device connector is located in a recessed section defined by a computing device chassis, and the movement of the connector fastener extension member away from the cable connector and towards the cable extends the connector fastener extension member past an entrance to the recessed section of the computing device chassis.

* * * * *